(12) United States Patent
Pandya et al.

(10) Patent No.: US 7,081,764 B1
(45) Date of Patent: Jul. 25, 2006

(54) INTERCONNECTION AND CONTROL OF ALIEN CROSS-TALK TEST SIGNAL UNITS

(75) Inventors: Harshang Pandya, Singapore (SG); Xing Zhu, Singapore (SG)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 11/299,164

(22) Filed: Dec. 8, 2005

Related U.S. Application Data

(63) Continuation-in-part of application No. 11/196,113, filed on Aug. 3, 2005.

(51) Int. Cl.
G01R 27/28 (2006.01)
H04J 1/12 (2006.01)

(52) U.S. Cl. .................. 324/628; 324/539; 370/201

(58) Field of Classification Search ............ 324/628, 324/539; 370/201
See application file for complete search history.

(56) References Cited

U.S. PATENT DOCUMENTS 6,937,029 B1 * 8/2005 Gambardella et al. ...... 324/627
2003/0099350 A1 * 5/2003 Bostoen et al. ............. 379/417
2005/0207561 A1 * 9/2005 Hammond ................... 324/600

* cited by examiner

*Primary Examiner*—Anjan Deb
*Assistant Examiner*—Timothy J. Dole

(57) ABSTRACT

An alien cross-talking testing system employs a plurality of alien cross-talk test signal units, an alien cross-talk measurement unit and an interconnection base unit. Each alien cross-talk test signal unit is in electrical communication with a different disturber cable to participate in a transmission of a RF test signal thereon. The alien cross-talk measurement unit is in electrical communication with a victim cable to measure an alien cross-talk signal generated on the victim cable in response to any alien cross-talk coupling between the victim cable and one or more of the disturber cables. The interconnection base unit is in electrical communication with the alien cross-talk measurement unit and the plurality of alien cross-talk test signals units to control non-simultaneous transmissions by the plurality of alien cross-talk test signal units of the RF test signals at a same frequency on the disturber cables as commanded by the alien cross-talk measurement unit.

20 Claims, 33 Drawing Sheets

INTERCONNECTION AND CONTROL OF ALIEN CROSS-TALK TEST SIGNAL UNITS

CROSS-REFERENCE TO RELATED APPLICATION

This application is a continuation-in-part of U.S. patent application Ser. No. 11/196,113, entitled "TEST SYSTEM AND METHOD FOR FIELD MEASUREMENT OF ALIEN CROSS-TALK" and filed Aug. 3, 2005.

BACKGROUND OF THE INVENTION

Alien cross-talk between cables reduces the operational bandwidth of a cabling channel because of an increased level of cross-talk noise decreasing the overall signal-to-noise ratio. Thus, with the recent deployment of high-speed networking, the measurement of alien cross-talk has become an important issue.

A powersum alien cross-talk measurement typically involves a "victim" cable having four (4) wire pairs being tested with n number of "disturber" cables, each having four (4) wire pairs. One specific approach is to test the "victim" cable with only one of the "disturber" cables at a time in the context of separately measuring powersum alien near end cross-talk ("PSANEXT") and powersum alien far end cross-talk ("PSAFEXT") for each wire pair. Drawbacks to this approach is it extremely time consuming and error-prone.

Another specific approach is to enclose the 'victim" cable with n number of "disturber" cables that are excited with white noise. Drawbacks to this approach is its complexity and power consumption with an inaccurate measurement.

Thus, a need exists to provide a solution for alien cross-talk testing in a complete, convenient, cost effective and expedient manner.

SUMMARY OF THE INVENTION

The present invention provides an alien cross-talk testing that is complete, convenient, cost effective and expedient. In particular, an alien cross-talk testing involving a non-simultaneous RF test signal transmissions at same frequency for difference disturber cables and a support for alien cross-talk mitigation.

A first form of the present invention is an alien cross-talking testing system comprising a plurality of alien cross-talk test signal units, an alien cross-talk measurement unit and an interconnection base unit. Each alien cross-talk test signal unit is in electrical communication with a different disturber cable to participate in a transmission of a RF test signal thereon. The alien cross-talk measurement unit is in electrical communication with a victim cable to measure an alien cross-talk signal generated on the victim cable in response to any alien cross-talk coupling between the victim cable and one or more of the disturber cables. The interconnection base unit is in electrical communication with the alien cross-talk measurement unit and the plurality of alien cross-talk test signals units to control non-simultaneous transmissions by the plurality of alien cross-talk test signal units of the RF test signals at a same frequency on the disturber cables as commanded by the alien cross-talk measurement unit.

A second form of the present invention is an interconnection base unit comprising an interconnection interface and a control module. In operation, the interconnection interface establishes an electrical communication between the interconnection base unit and a plurality of alien cross-talk test signal units connected to a plurality of disturber cables to transmit RF test signals thereon. The interconnection interface further establishes an electrical communication between the interconnection base unit and an alien cross-talk measurement unit connected to a victim cable to measure an alien cross-talk signal generated on the victim cable in response to any alien cross-talk coupling between the victim cable and one or more of the disturber cables. Based on the electrical communications, the control module controls non-simultaneous transmissions by the plurality of alien cross-talk test signal units of the RF test signals at a same frequency on the disturber cables as commanded by the alien cross-talk measurement unit.

A third form of the present invention is a method of operating an interconnection base unit. The method comprises an establishment of an electrical communication between the interconnection base unit and a plurality of alien cross-talk test signal units connected to a plurality of disturber cables to transmit RF test signals thereon, an establishment of an electrical communication between the interconnection base unit and an alien cross-talk measurement unit connected to a victim cable to measure an alien cross-talk signal generated on the victim cable in response to any alien cross-talk coupling between the victim cable and one or more of the disturber cables, and a controlling of non-simultaneous transmissions by the plurality of alien cross-talk test signal units of the RF test signals at a same frequency on the disturber cables as commanded by the alien cross-talk measurement unit.

The aforementioned forms and other forms as well as objects and advantages of the present invention will become further apparent from the following detailed description of the various embodiments of the present invention read in conjunction with the accompanying drawings. The detailed description and drawings are merely illustrative of the invention rather than limiting, the scope of the present invention being defined by the appended claims and equivalents thereof.

DETAILED DESCRIPTION

Figure 1:
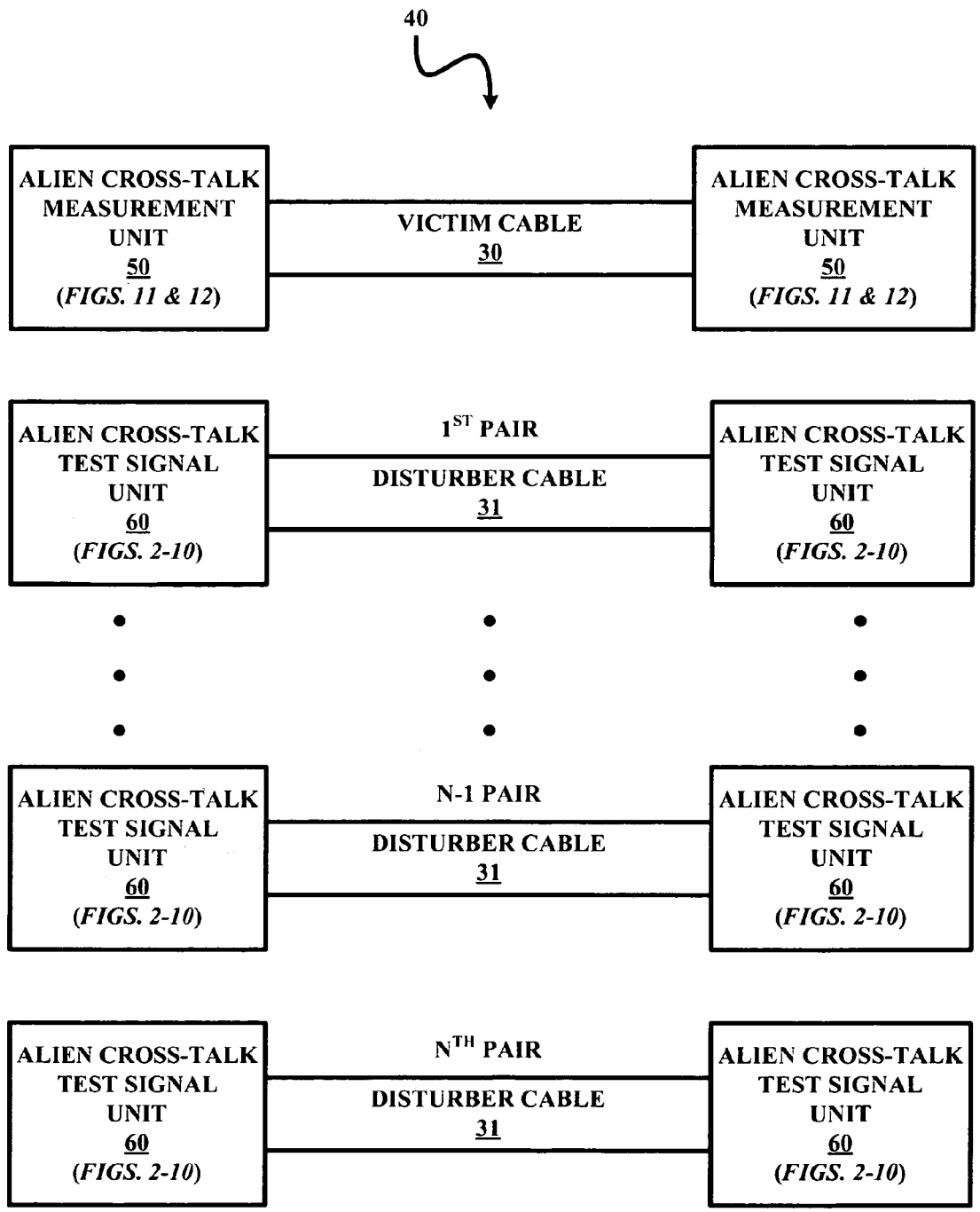
FIG. 1 illustrates a first embodiment of an alien cross-talk test system in accordance with the present invention.

FIG. 1 illustrates an alien cross-talk test system 40 of the present invention employing a pair of alien cross-talk measurement units 50 and a N number of pairs of alien cross-talk test signal units 60, where $N \geq 1$. Generally, cross-talk measurement units 50 are structurally configured to be connected to opposing ends of a victim cable 30 having an M number of wire pairs, and each pair of alien cross-talk test signal units 60 are structurally configured to be connected to opposing ends of a disturber cable 31 having M number of wire pairs, where $M \geq 1$. Each pair of cross-talk generators 60 are further structurally configured to generate an alien cross-talk test signal on one end of connected disturber cable 31 and to terminate the alien cross-talk test signal on the other end of the disturber cable 31. Cross-talk measurement units 50 are further structurally configured to measure an alien cross-talk signal on one end of victim cable 30, and to terminate the alien cross-talk signal on the other end of the victim cable 30. The alien cross-talk signal on victim cable 30 is generated by an alien cross-talking coupling between victim cable 30 and a disturber cable 31 as an alien cross-talk test signal is being transmitted between corresponding alien cross-talk test signal units 60.

In practice, the present invention does not impose any limitations or any restrictions to the structural embodiments of alien cross-talk measurement units 50 and alien cross-talk test signal units 60. Thus, the following descriptions of various structural embodiments of alien cross-talk measurement units 50 connected with FIGS. 11 and 12, and various structural embodiments of alien cross-talk test signal units 60 connected with FIGS. 2–10 neither limit nor restrict a scope of structural embodiments of alien cross-talk measurement units 50 and structural embodiments of alien cross-talk test signal units 60.

Figure 2:
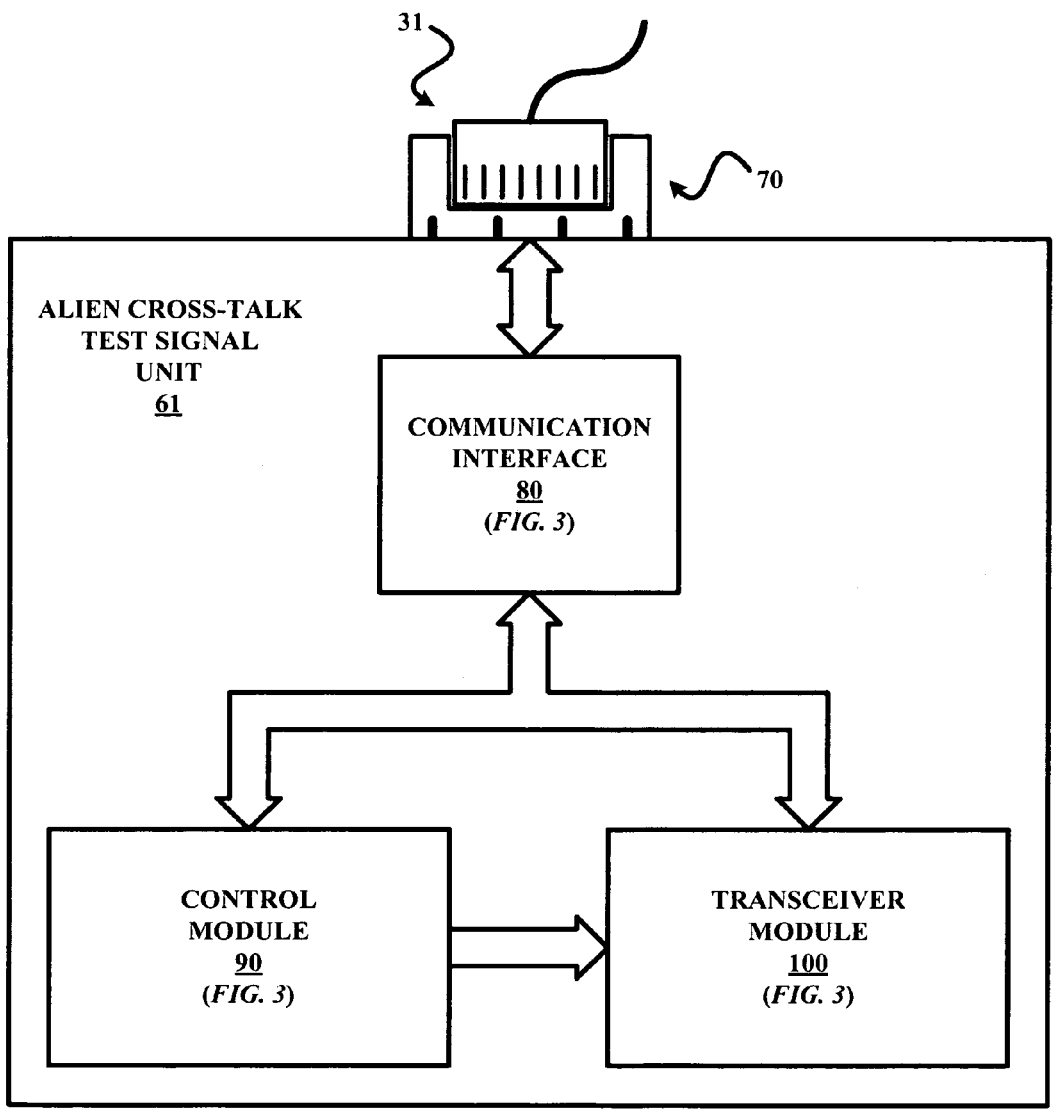
FIG. 2 illustrates one embodiment of a alien cross-talk test signal unit illustrated in FIG. 1 in accordance with the present invention.

FIG. 2 illustrates a general embodiment 61 of alien cross-talk test signal unit 60 (FIG. 1). Alien cross-talk test signal unit 61 employs a cable jack 70 (e.g., a RJ-45 jack), a communication interface 80, a control module 90 and a transceiver module 100. Cable jack 70 is structurally configured to connect test unit 61 to one end of a disturber cable 31 having four (4) wire pairs (i.e., M=4) as shown. Communication interface 80 is structurally configured to transmit and receive alien cross-talk test signals with another test unit 61 connected to an opposing end of disturber cable 31 (not shown). In an alternative embodiment, communication interface 80 is further structurally configured to exchange logical commands on behalf of control module 90 with another test unit 61 connected to an opposing end of disturber cable 31

Transceiver module 100 is structurally configured to selectively transmit an alien cross-talk test signal via interface 80 to another test unit 61 connected to the opposing end of disturber cable 31 or terminate an alien cross-talk test signal received via interface 80 from another test unit 61 connected to the opposing end of disturber cable 31. Control module 90 is structurally configured to selectively set transceiver module 100 as an alien cross-talk test signal transmitter or an alien cross-talk test signal terminator based on commands received by control module 90. In one embodiment, control module 90 is further structurally configured to manually receive the commands from a user of test unit 61. In a second embodiment, control module 90 is further structurally configured to receive logical commands via interface 80 from another test unit 61 connected to the opposing end of disturber cable 31. In a third embodiment, control is further structurally configured to receive both manual commands and logical commands.

In an alternative embodiment of test unit 61, transceiver module 100 can be structurally configured to selectively transmit an alien cross-talk test signal via interface 80 to another test unit 61 connected to the opposing end of disturber cable 31 or to be set in an idle state. For this alternative embodiment, transceiver module 100 is selectively set by control module 90 as either an active alien cross-talk test signal transmitter or an idle alien cross-talk test signal transmitter.

In an alternative embodiment of test unit 61, transceiver module 100 can be structurally configured to selectively terminate an alien cross-talk test signal received via interface 80 from another test unit 61 connected to the opposing end of disturber cable 31 or to be set in an idle state. For this alternative embodiment, transceiver module 100 is selectively set by control module 90 as either an active alien cross-talk test signal terminator or an idle alien cross-talk test signal terminator.

Figure 3:
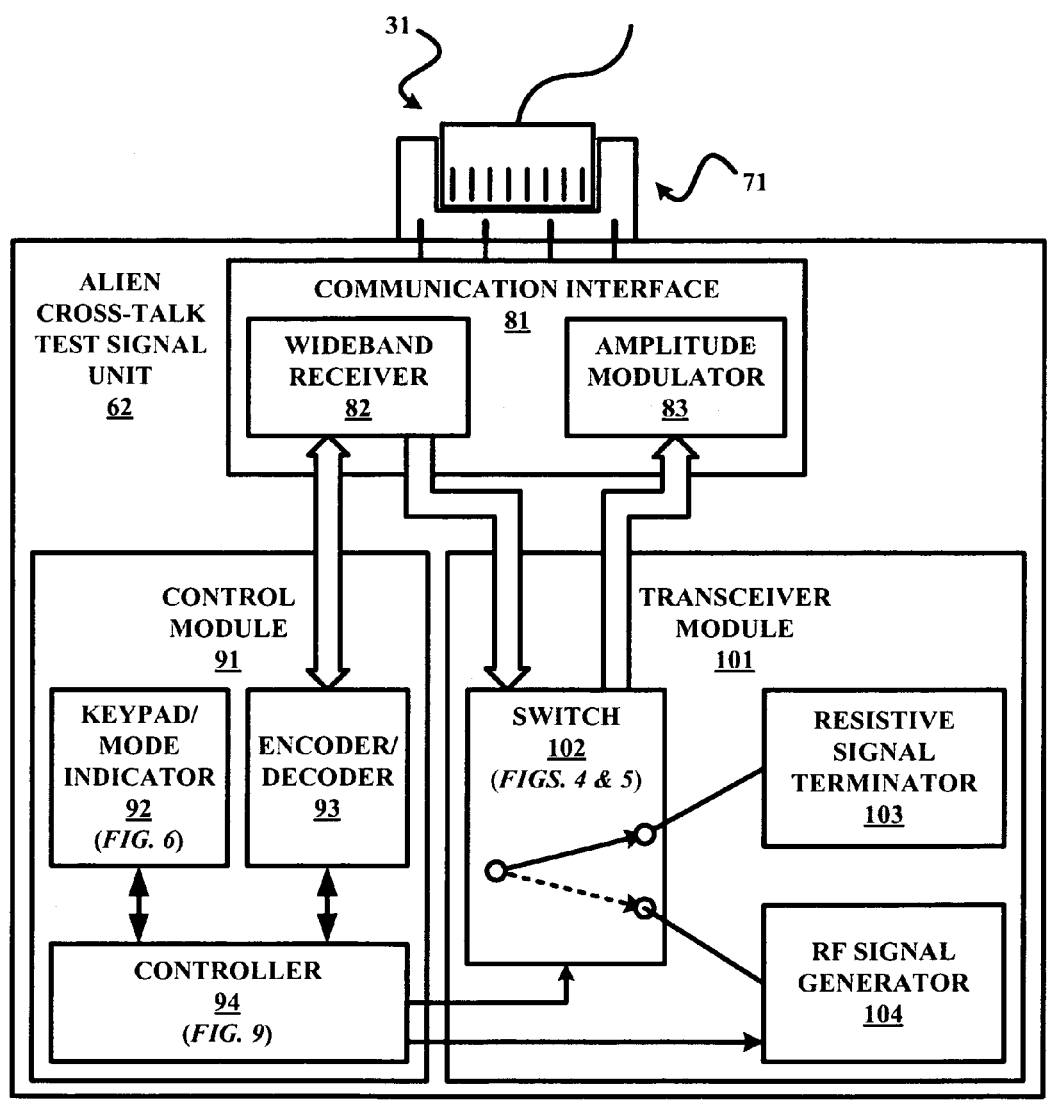
FIG. 3 illustrates one embodiment of the alien cross-talk test signal unit illustrated in FIG. 2 in accordance with the present invention.

FIG. 3 illustrates a specific embodiment 62 of alien cross-talk test signal unit 60 (FIG. 1). Cross-talk test unit 62 employs cable jack 71, a communication interface 81, a control module 91 and a transceiver module 101. Cable jack 71 is structurally configured to connect test unit 62 to one end of a disturber cable 31 having four (4) wire pairs (i.e., M=4) as shown.

Communication interface 81 includes a wideband receiver 82 structurally configured to exchange commands with and receive alien cross-talk test signals in the form of RF test signals from another test unit 62 connected to an opposing end of disturber cable 31 (not shown). Communication interface 81 further includes an amplitude modulator 83 structurally configured to amplitude modulate and transmit alien cross-talk test signals in the form of RF test signal to another test unit 62 connected to an opposing end of disturber cable 31.

Transceiver module 101 includes a switch 102, a resistive signal terminator 103 and a RF signal generator 104. Switch 102 is structurally configured to switch between resistive signal terminator 103 and RF signal generator 104 as commanded by a controller 94 of control module 91.

Resistive signal terminator 103 is structurally configured to terminate RF test signals received via receiver 82 from another test unit 62 connected to the opposing end of disturber cable 31 when resistive signal terminal 103 is connected to wideband receiver 82 via switch 102. In an exemplary embodiment, resistive signal terminator 103 is structurally configured by design to provide a 100Ω differential termination and a 50Ω common mode termination.

RF signal generator 104 is structurally configured to generate the RF test signal having a definitive test pattern as commanded by controller 94 (e.g., linear, logarithmic, stepped-up and stepped-down) whereby the RF test signal is transmitted via modulator 83 to another test unit 62 connected to the opposing end of disturber cable 31 when RF signal generator 104 is connected to amplitude modulator 83 via switch 102. In an exemplary embodiment, RF signal generator 104 is structurally configured by design to generate an AC signal (e.g., sine waves, square waves, triangular waves, ramp waves and the like) whereby the RF test signal is test patterned as commanded by controller 94 as a frequency sweep test signal having a fixed stepped-up pattern at frequencies in an alien cross-talk measurement range (e.g., 1 MHZ to 1 GHz). Those having ordinary skill in the art will appreciate other types of test patterns for a frequency sweep test signal that are applicable to the present invention.

Figure 4:
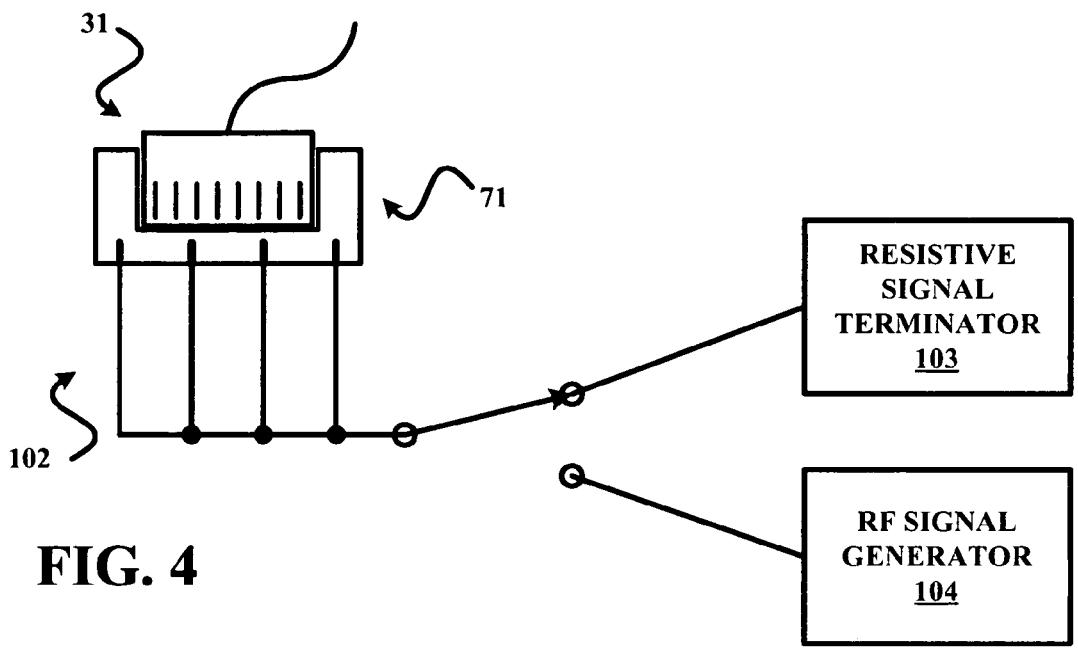
FIGS. 4 and 5 illustrate one embodiment of a switch illustrated in FIG. 3 in accordance with the present invention.
Figure 5:
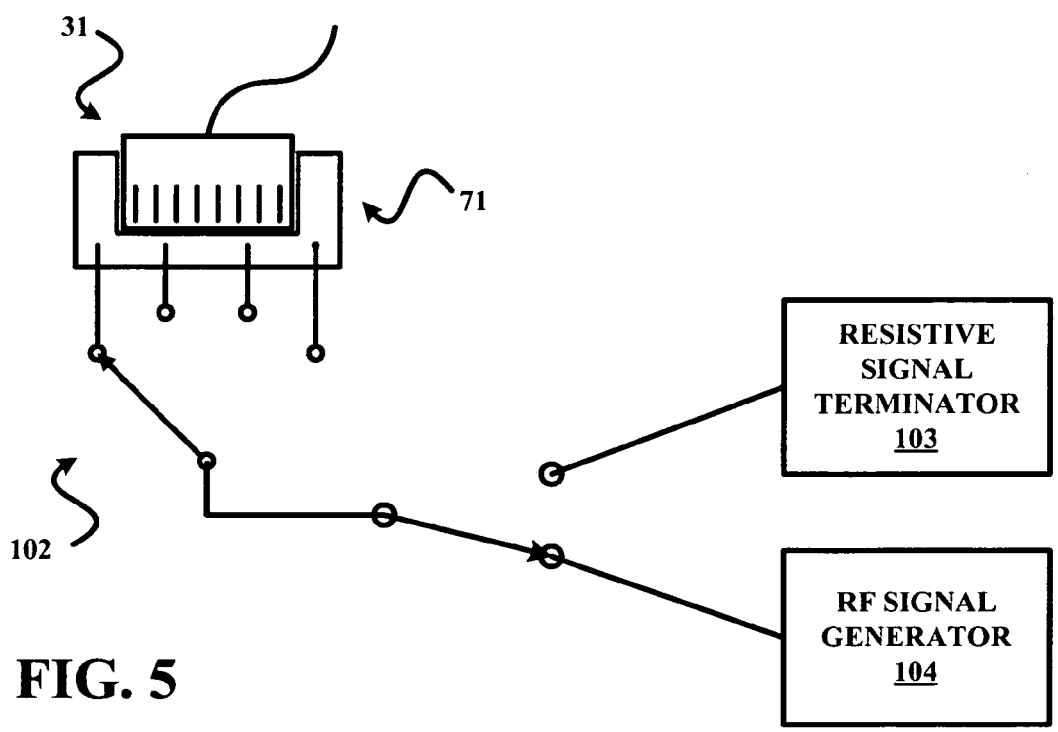

FIGS. 4 and 5 illustrates an exemplary structural configuration of switch 102 in the context of disturber cable 31 having the four (4) pairs of wires. Referring to FIG. 4, switch 102 is structurally configured to connect resistive signal terminator 103 via receiver 82 (not shown) to all four (4) pairs of wires of disturber cable 31 when commanded by controller 94 to connect resistive signal terminator 103 to disturber cable 31. Referring to FIG. 5, switch 102 is structurally configured to connect RF signal generator 104 to a specific pair of the (4) pairs of wires of disturber cable 31 via modulator 83 (not shown) when commanded by controller 94 to connect RF signal generator 104 to the specific pair of the (4) pairs of wires of disturber cable 31. In the context of the RF test signal being a stepped-up RF frequency sweep test signal, controller 94 can command switch 102 to individually select each wire pair during each frequency of the stepped-up RF frequency sweep test signal.

Figure 6:
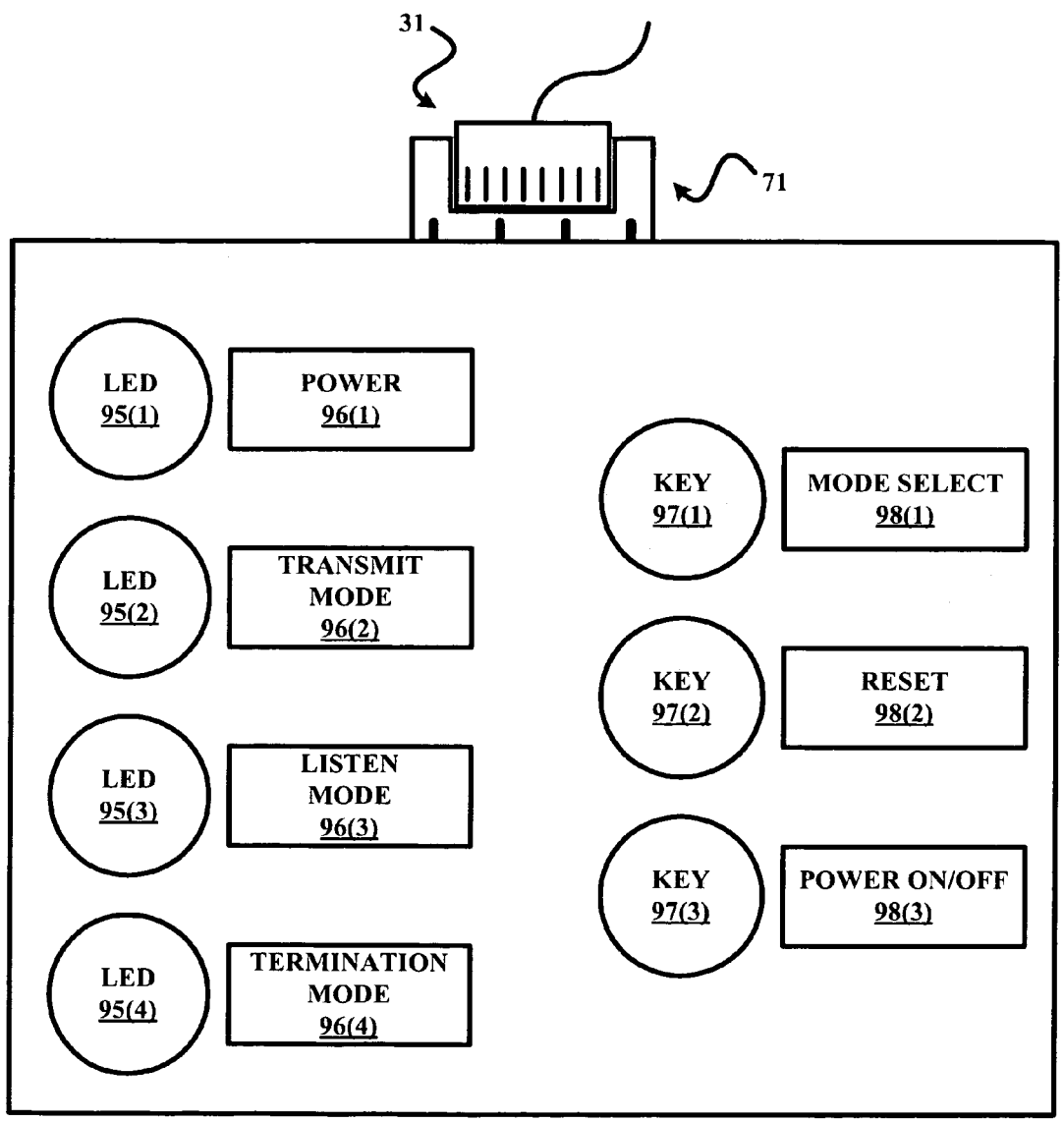
FIG. 6 illustrates one embodiment of a keypad/LED indicator illustrated in FIG. 3 in accordance with the present invention.

Referring again to FIG. 3, control module 91 includes a keypad/mode indicator 92, an encoder/decoder 93, and controller 94. Keypad/LED indicator 92 is structurally configured to visually indicate a working mode of test unit 62 as well as provide keys to facilitate a manual entry of commands to controller 94. FIG. 6 illustrates an exemplary embodiment of keypad/LED indicator 92 as mounted on an exterior of test unit 62.

Referring to FIGS. 3 and 6, indicator 92 includes four (4) pairs of a light emitting diode ("LED") 95 and a working mode label 96, and three (3) pairs of a key 97 and a command label 98. An activation of LED 95(1) indicates test unit 62 is powered on. An activation of LED 95(2) indicates test unit 62 is set in a transmit mode defined by a connection of RF signal generator 104 to amplitude modulator 83 via switch 102 as commanded by controller 94 whereby test unit 62 is operating as a RF signal transmitter. An activation of LED 95(3) indicates test unit 62 is set in a listen mode defined by a connection of resistive signal terminator to wideband receiver 82 via switch 102 as commanded by controller 94 whereby test unit 62 is operating as an active RF signal terminator. An activation of LED 95(3) indicates test unit 62 is reset in a termination mode defined by a connection of resistive signal terminator to wideband receiver 82 via switch 102 as commanded by controller 94 whereby test unit 62 is operating as a default RF signal terminator.

Key 97(1) enables a user of test unit 62 to manually select one of working modes of test unit 62 among the transmit mode, the listen mode and the termination mode whereby a mode selection is indicated by one of the LED(s) 95(2), 95(3) and 95(4). Key 97(2) enables a user of test unit 62 to reset test unit 62 as well as another test unit 62 connected to an opposing end of disturber cable 31 whereby the reset in indicated by an activation of LED 95(4). Key 97(3) enables a user of test unit 62 to power on or off test unit 62 as indicated by an activation or deactivation of LED 95(1).

Referring again to FIG. 3, encoder/decoder 93 is structurally configured to encode commands generated by controller 94 for another test unit 62 connected to an opposing end of disturber cable 31 and to decode commands received on behalf of controller 94 from another test unit 62 connected to an opposing end of disturber cable 31. In one embodiment, the commands are in the form of RF logical signals that are encoded and decoded as needed in accordance with the following TABLE 1:

TABLE 1

| LOGICAL SIGNAL | 01 | 10 | 11 | 00 |
|---|---|---|---|---|
| ACTION | Reset | Switch Working Mode | Feedback/ Verification | Idle |

Figure 7:
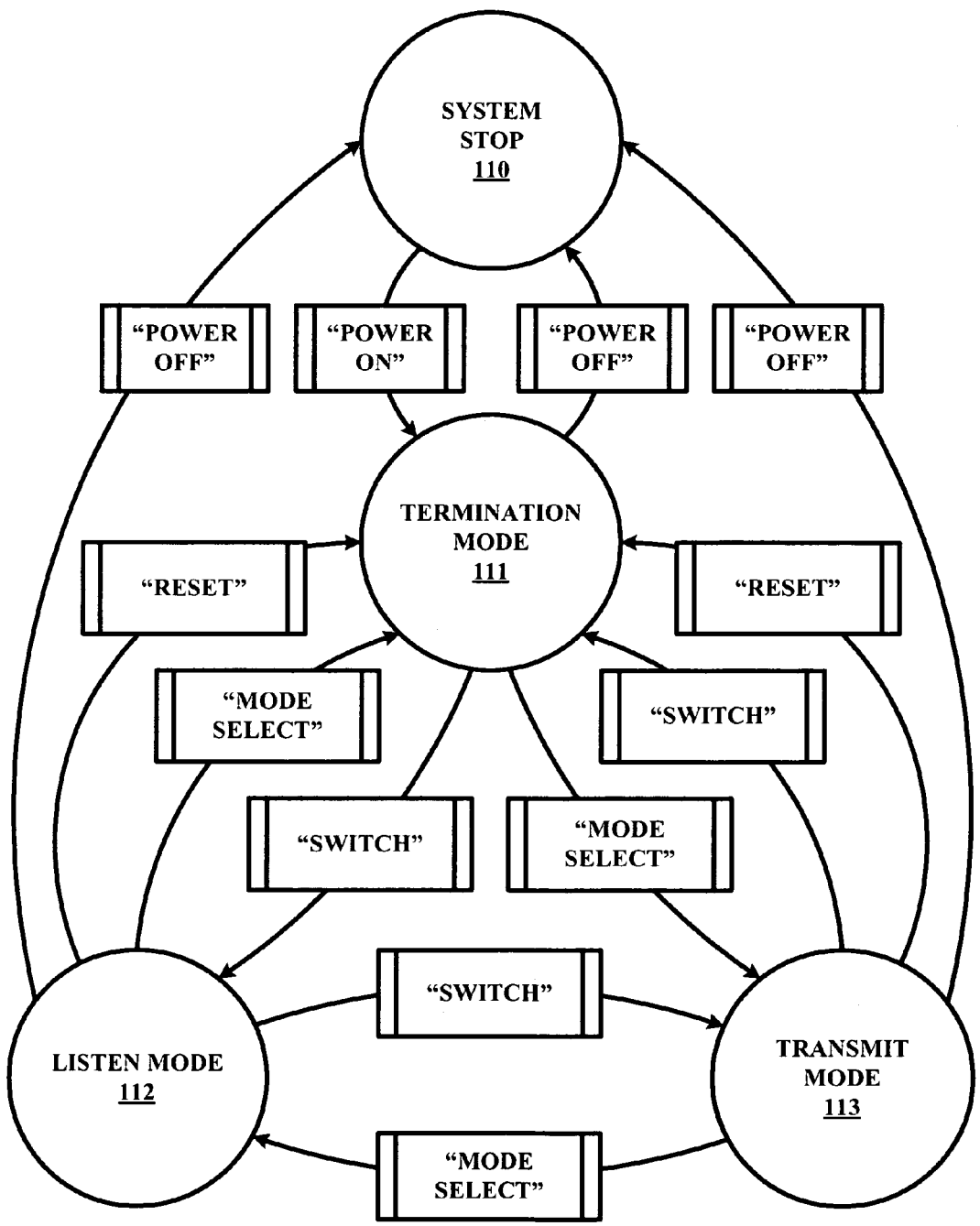
FIG. 7 illustrates one embodiment of a working mode diagram of an alien cross-talk test signal unit in accordance with the present invention.

Controller 94 is structurally configured to control a test pattern of the RF test signal by RF signal generator 104, to set switch 102 as commanded (manually or logically) to thereby control a transmission of the RF test signal to another test unit 62 connected to the opposing end of disturber cable 31 or terminate a RF test signal received from another test unit connected to the opposing end of disturber cable 31, and to exchange logic commands in accordance with TABLE 1 with another test unit 62 connected to an opposing end of disturber cable 31. These logical functions enable controller 94 to control the working mode of test unit 62 when test unit is serving as a remote test unit. FIG. 7 illustrates a state diagram of test unit 62 to facilitate an understanding of the working mode control exhibited by controller 94.

Referring to FIGS. 6 and 7, a system stop 110 is an initial state of test unit 62. Controller 94 transitions test unit 62 to a termination mode 81 as represented by the "POWER ON" arrow in response to a powering on of generator 60 via power on/off key 97(3) as indicated by LED 95(1). In a manual context, a user of test unit 62 can use mode select key 97(1) to sequentially transition among transmit mode 113, listen mode 112 and termination mode 111 as represented by the "MODE SELECT" arrows. In a logical context, test unit 62 can automatically sequentially transition among termination mode 111, listen mode 112 and transmit mode 113 as represented by the "SWITCH" arrows in response to logical commands 10 received from another test unit 62 connected to an opposing end of disturber cable 31. Additionally, test unit 62 can immediately transition from either listen mode 112 and transmit mode 113 to termination mode 111 as represented by the "RESET" arrows in response to a manual command via reset key 97(2) (FIG. 6) or in response to a logical command 01 received from another test unit 62 connected to an opposing end of disturber cable 31. At any time, test unit 62 can be transitioned back to system stop 110 upon a powering off of test unit 62 via power on/off key 97(3) as represented by the "POWER OFF" arrows.

In accordance with the state diagram, a corresponding working mode of a near end test and a far end test involving test unit 62 is listed in the following TABLE 2:

TABLE 2

| | TESTING CASES | | |
|---|---|---|---|
| | STANDY | ANEXT | AFEXT |
| NEAR END WORKING MODE: | Termination | Transmit | Listen |
| FAR END WORKING MODE: | Termination | Listen | Transmit |

A description of an exemplary alien cross-talk environment will now be provided herein to facilitate an understanding of an alien cross-talking test in accordance with the present invention. In the exemplary alien cross-talk environment as shown in FIG. 8, the M number of wires pairs for the cables is four (4) and the N number of disturber cables is three (3).

Figure 8:
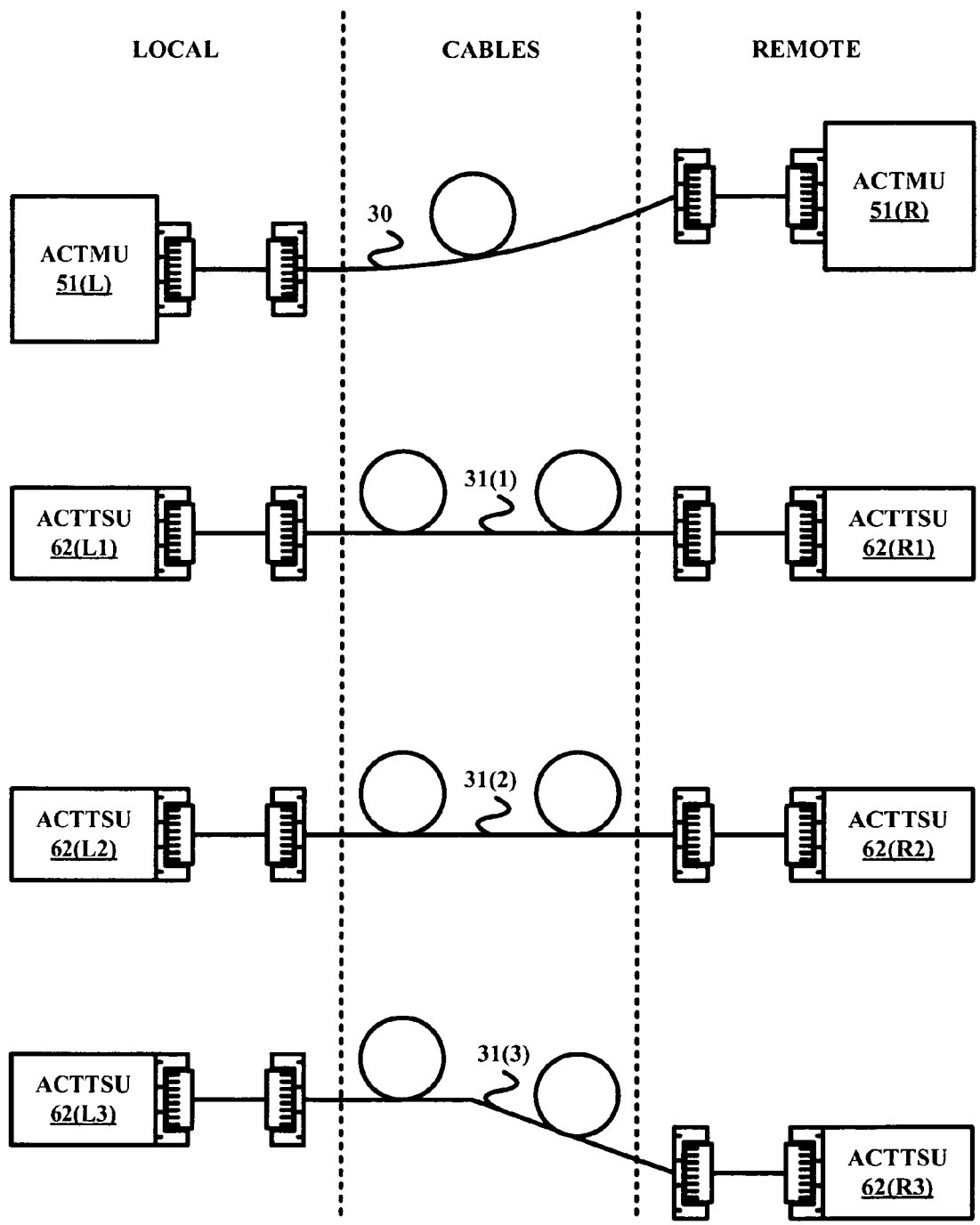
FIG. 8 illustrates one embodiment of the alien cross-talk test system illustrated in FIG. 1 in accordance with the present invention.

Referring to FIG. 8, a local alien cross-talk measurement unit ("ACTMU") 51(L) is connected to one end of victim cable 30 and a remote alien cross-talk measurement unit 51(R) is connected to an opposing end of victim cable 30. In one embodiment, alien cross-talk measurement units 51 are spectrum analyzers (e.g., a WireScope and a DualRemote, respectively, as sold by Agilent) or field cable testers having RJ-45 jacks or equivalent and memories that are programmed with computer code to selectively implement an alien cross-talk termination method in accordance with a flowchart 140 illustrated FIG. 11 and an alien cross-talk measurement method in accordance with a flowchart 150 illustrated in FIG. 12 as will be further explained herein.

The three (3) alien cross-talk test signal unit ("ACTTSU") 62 pairings each involve a local alien cross-talk test signal unit 62(L) connected to one end of a disturber cable 31 and a remote alien cross-talk test signal unit 62(R) connected to an opposing end of disturber cable 31. A controller 94 of each test unit 62 is programmed to selectively implement a RF test signal generation method in accordance with a flowchart 120 illustrated FIG. 9 and RF test signal termination method in accordance with a flowchart 130 illustrated in FIG. 10 as will be further explained herein.

Flowcharts 120 and 130 will now be explained in the context of each test unit 62 being in the termination mode prior to receiving a command to transition to either the transmit mode or the listen mode.

Figure 9:
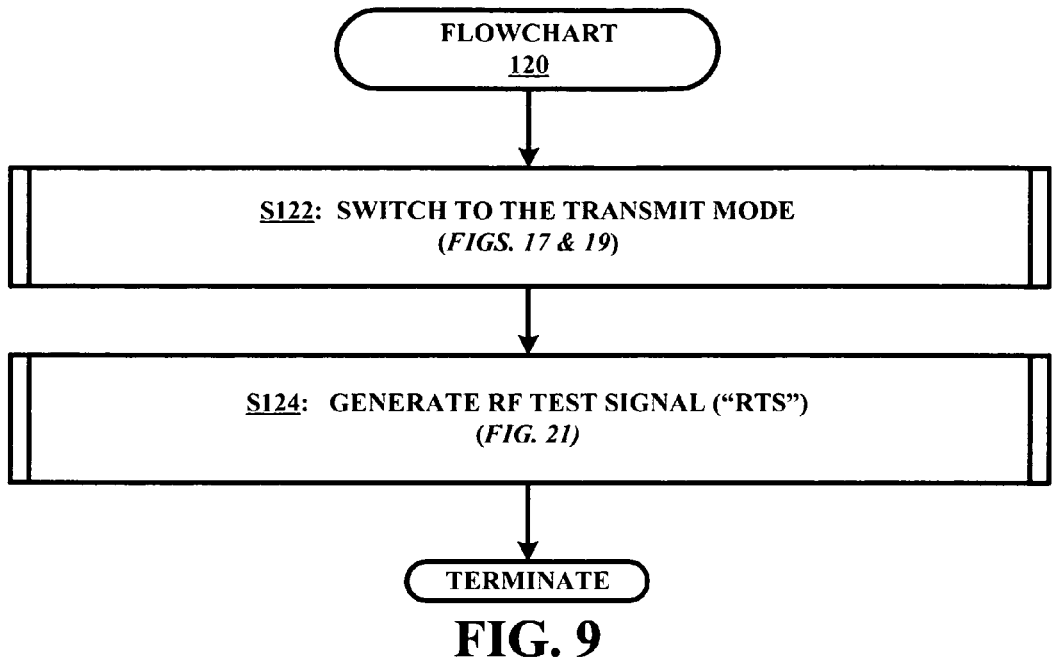
FIG. 9 illustrates a flowchart representative of one embodiment of a RF test signal generation method in accordance with the present invention.
Figure 13:
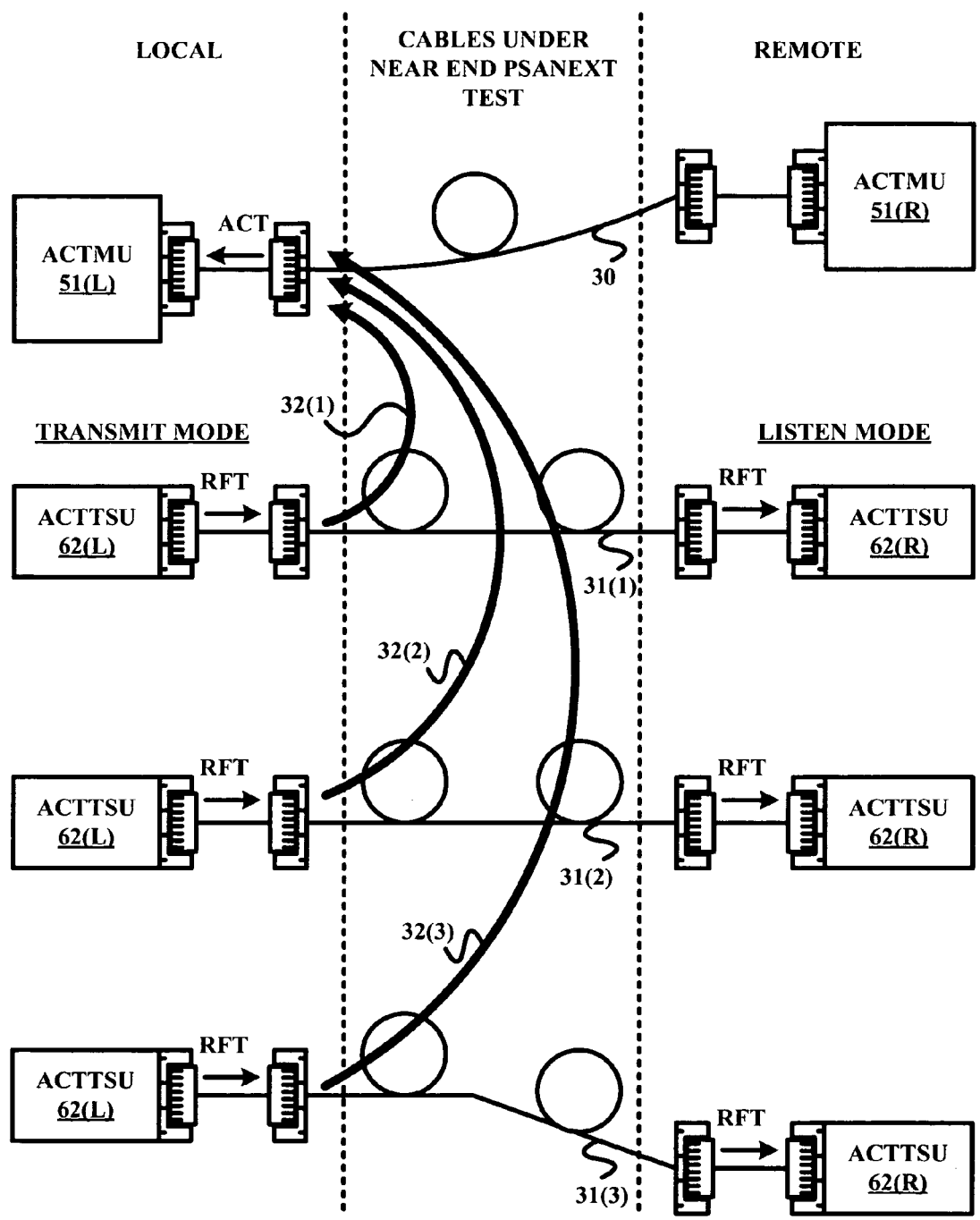
FIG. 13 illustrates an exemplary near end PSANEXT of the alien cross-talk system illustrated in FIG. 8 in accordance with the present invention.
Figure 14:
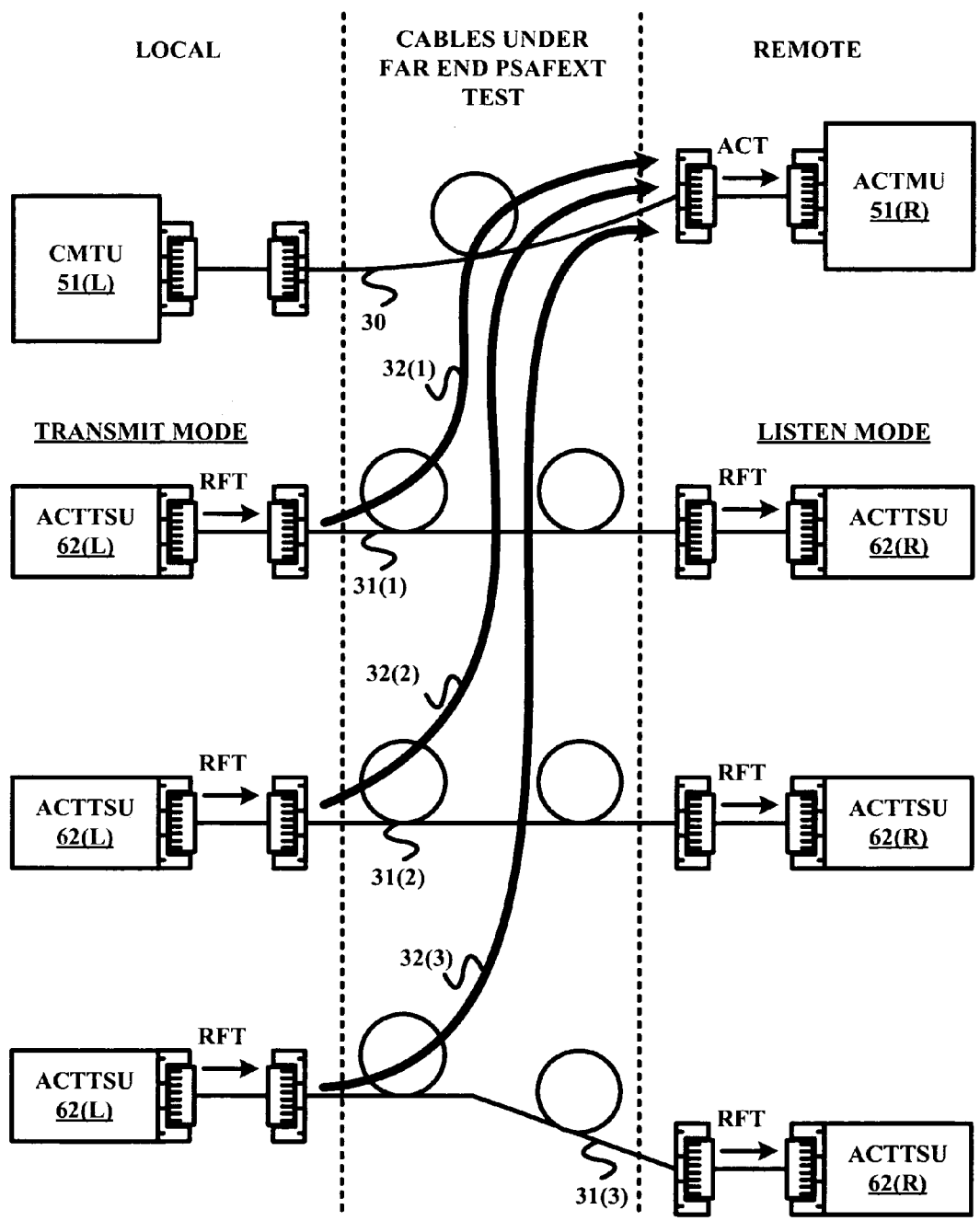
FIG. 14 illustrates an exemplary far end PSAFEXT of the alien cross-talk system illustrated in FIG. 8 in accordance with the present invention.
Figure 15:
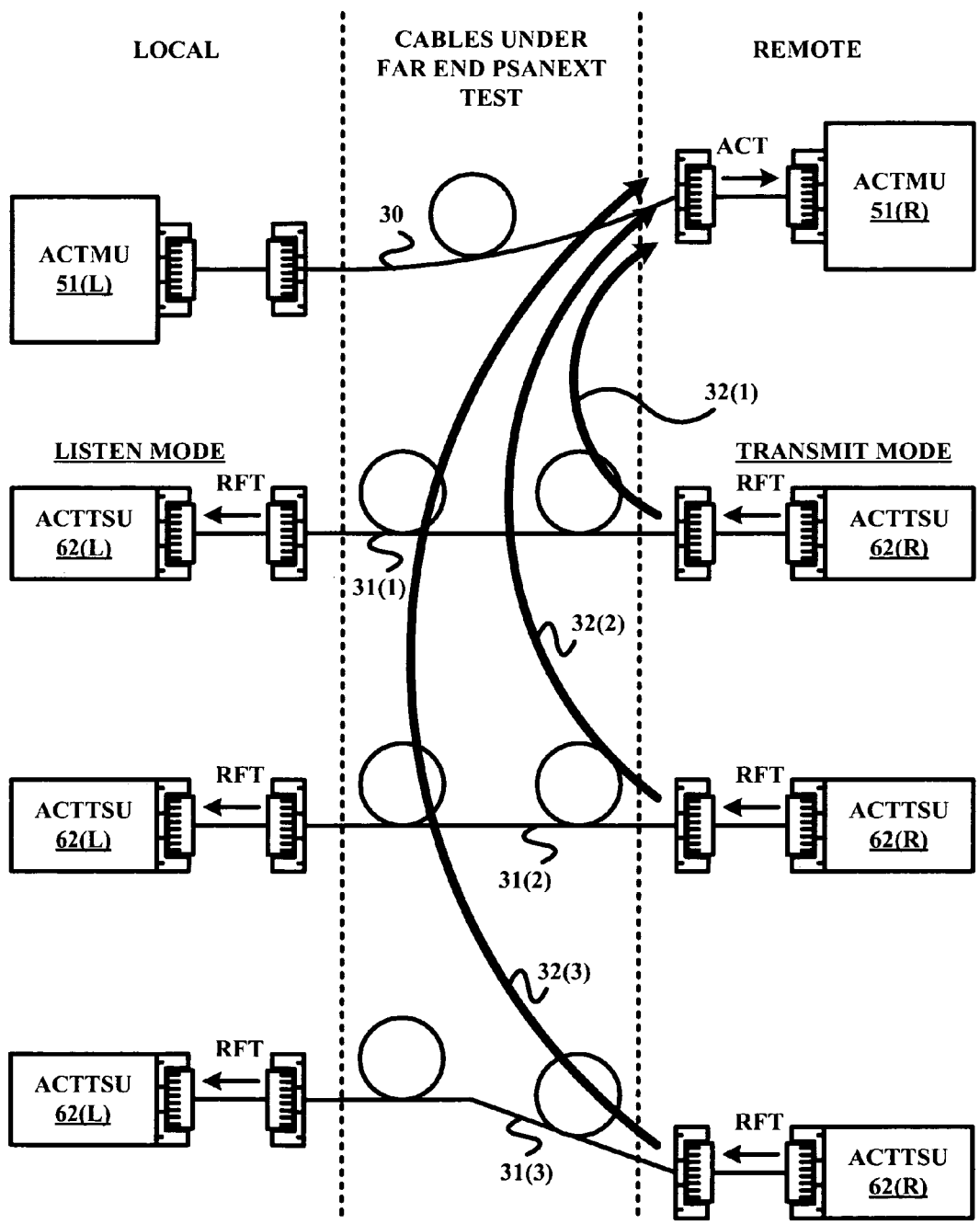
FIG. 15 illustrates an exemplary far end PSANEXT of the alien cross-talk system illustrated in FIG. 8 in accordance with the present invention.
Figure 16:
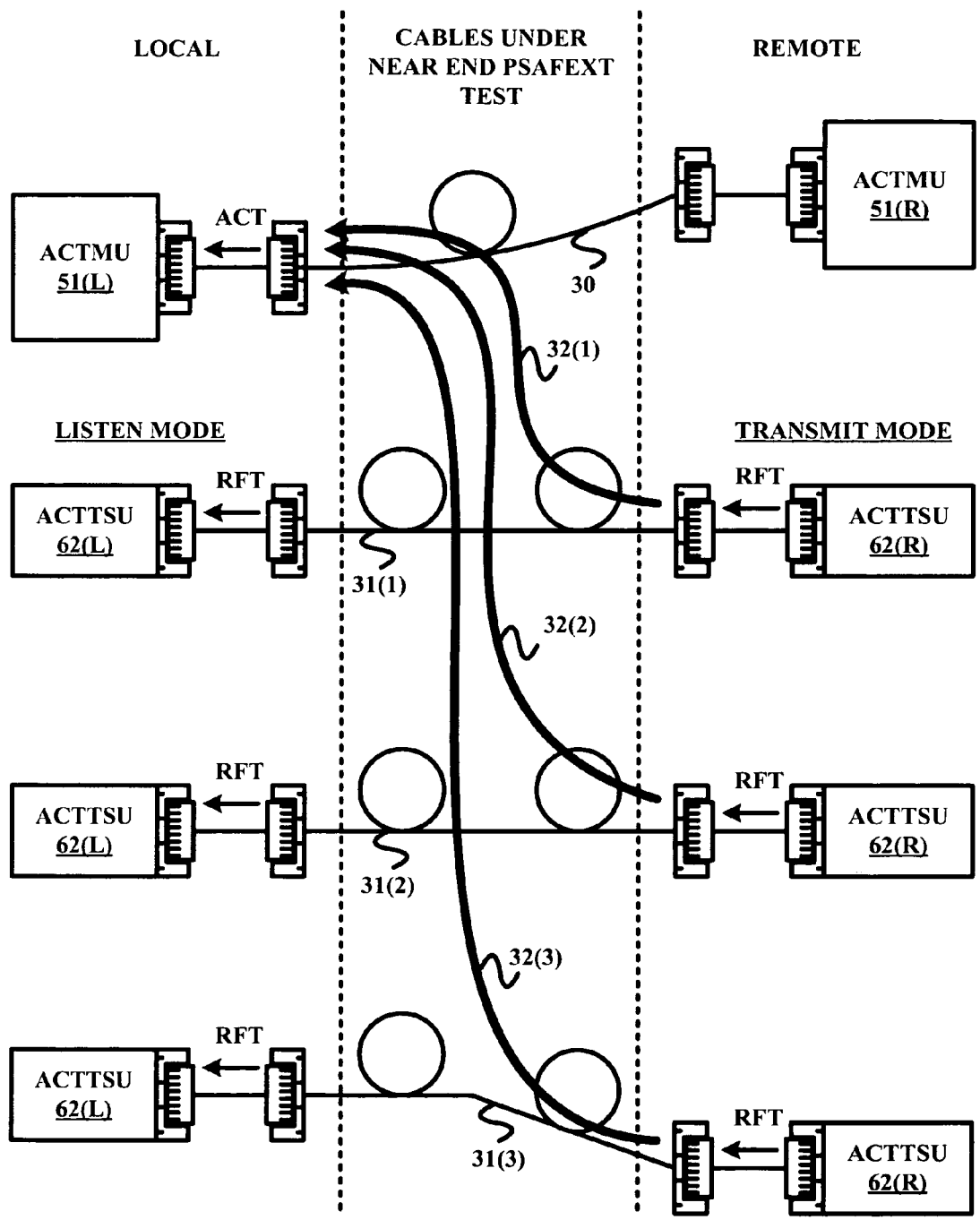
FIG. 16 illustrates an exemplary near end PSAFEXT of the alien cross-talk system illustrated in FIG. 8 in accordance with the present invention.

Referring to FIG. 9, controller 94 of a test unit 62 implements flowchart 120 in response to the test unit 62 serving as a local test unit under a near end powersum alien cross-talk near end ("PSANEXT") cable test shown in FIG. 13 or a far end powersum alien cross-talk far end ("PSAFEXT") cable test shown in FIG. 14, or as a remote test unit under a far end PSANEXT cable test shown in FIG. 15 or a near end PSAFEXT cable test shown in FIG. 16. A stage S122 of flowchart 120 encompasses controller 94 switching a corresponding test unit 62 from the termination mode to the transmit mode, and a stage S124 of flowchart 120 encompasses controller 94 commanding RF signal generator 104 to generate the RF test signal ("RFT") whereby the RF test signal is transmitted by test unit 62 to the connected disturber cable 31 as shown in FIGS. 13–16.

Figure 10:
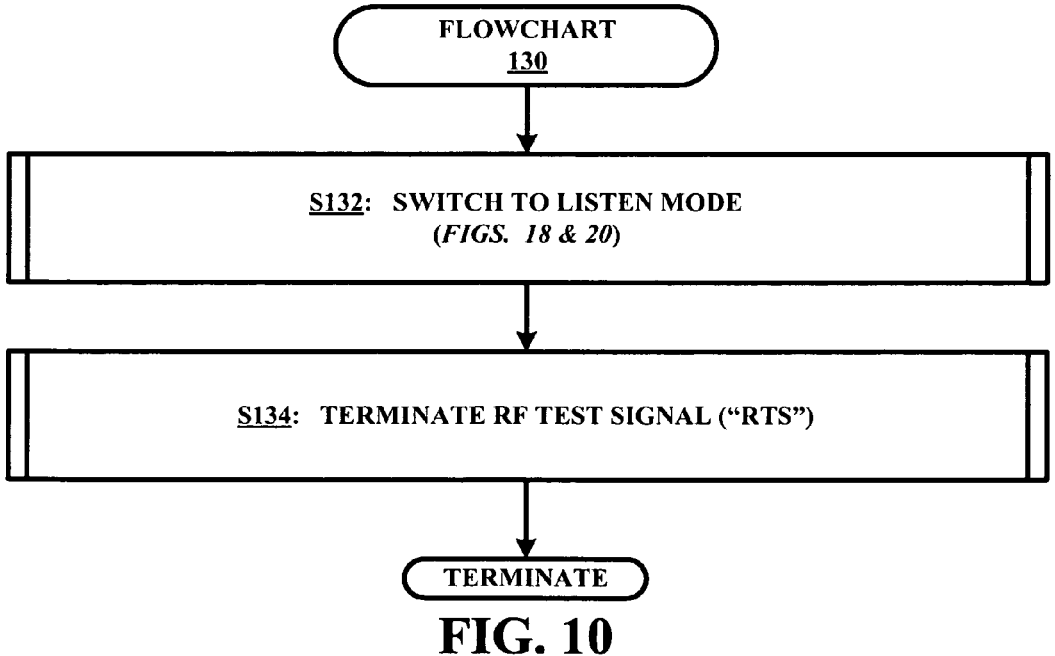
FIG. 10 illustrates a flowchart representative of one embodiment of a RF test signal termination method in accordance with the present invention.

Referring to FIG. 10, controller 94 of a test unit 62 implements flowchart 130 in response to the test unit 62 serving as a remote test unit under a near end PSANEXT cable test shown in FIG. 13 or a far end PSAFEXT cable test shown in FIG. 14, or as a local test unit under a far end PSANEXT cable test shown in FIG. 15 or a near end PSAFEXT cable test shown in FIG. 16. A stage S132 of flowchart 130 encompasses controller 94 switching a corresponding test unit 62 from the termination mode to the listen mode, and a stage S134 of flowchart 130 encompasses resistive signal terminator 103 terminating the RF test signal transmitted over the connected disturber cable 31 as shown in FIGS. 13–16.

Figure 11:
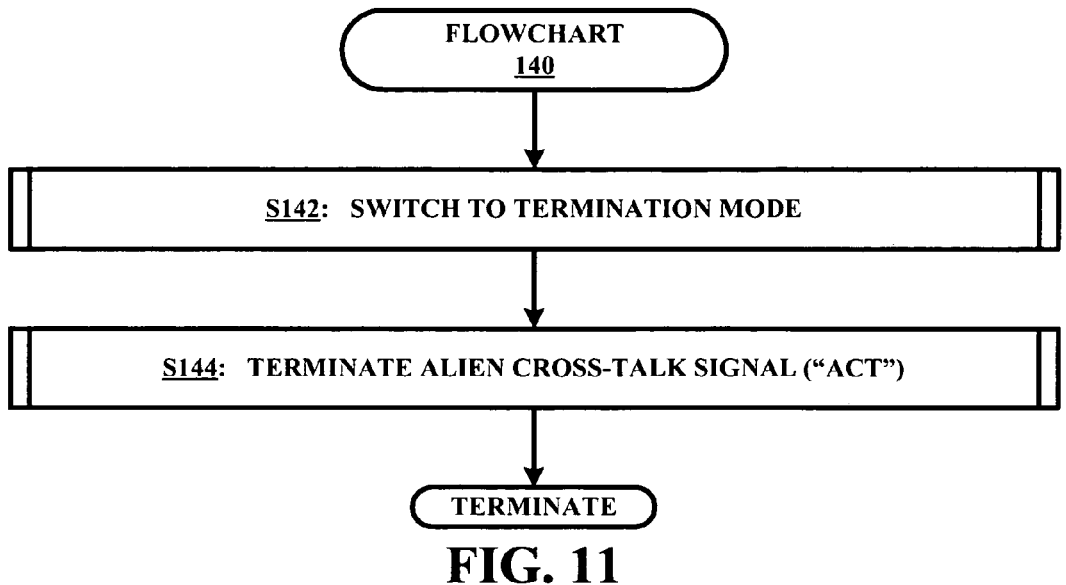
FIG. 11 illustrates a flowchart representative of one embodiment of an alien cross-talk signal termination method in accordance with the present invention.

Referring to FIG. 11, a controller (not shown) of measurement unit 51 implements flowchart 140 in response to the measurement unit 51 serving as a remote measurement unit under a near end PSANEXT cable test shown in FIG. 13 or a near end PSAFEXT cable test shown in FIG. 16, or as a local measurement unit under a far end PSAFEXT cable test shown in FIG. 14 or a far end PSANEXT cable test shown in FIG. 15. A stage S142 of flowchart 140 encompasses the controller of the measurement unit 51 being switched from an idle state to a termination mode, and a stage S144 of flowchart 140 encompasses a measurement unit 51 terminating an alien cross-talk signal ("ACT") generated on victim cable 30 in response to alien cross-talk couplings 32 between victim cable 30 and disturber cables 31 as the RF test signals are being transmitted over the disturber cables 31 as shown in FIGS. 13–16.

Figure 12:
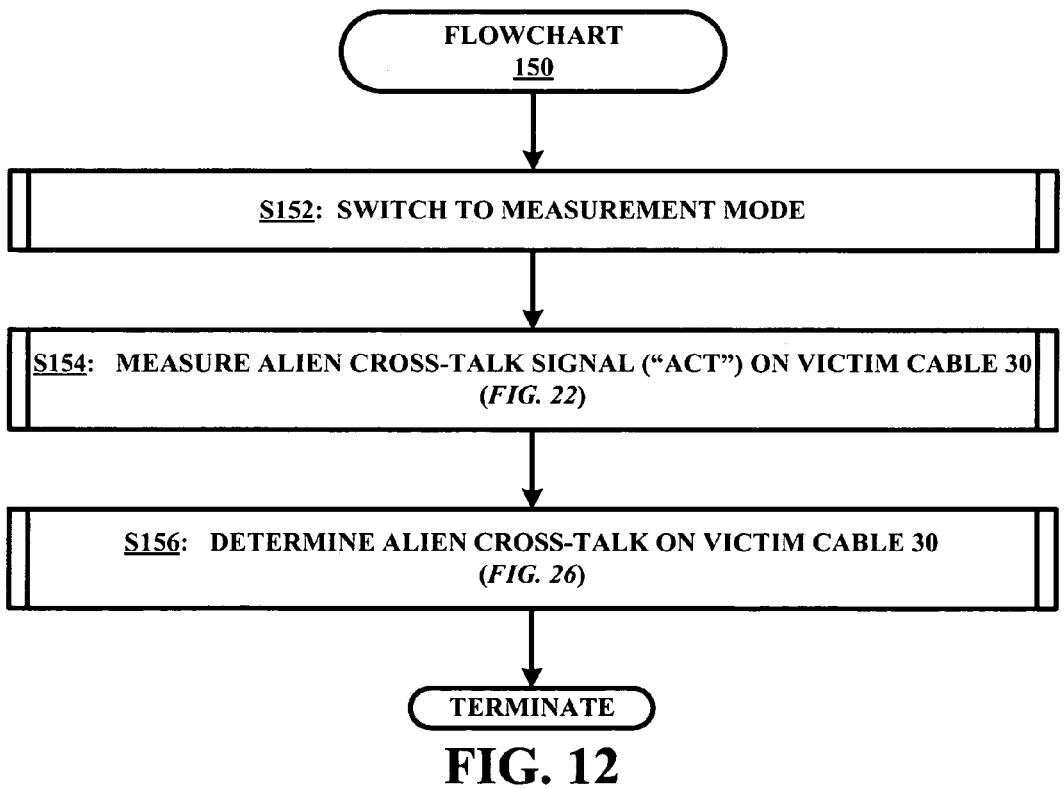
FIG. 12 illustrates a flowchart representative of a first embodiment of an alien cross-talk measurement method in accordance with the present invention.

Referring to FIG. 12, the controller of a measurement unit 51 implements flowchart 150 in response to the measurement unit 51 serving as a local measurement unit under a near end PSANEXT cable test shown in FIG. 13 or a near end PSAFEXT cable test shown in FIG. 16, or as a remote measurement unit under a far end PSAFEXT cable test shown in FIG. 14 or a far end PSANEXT cable test shown in FIG. 15. A stage S152 of flowchart 150 encompasses the controller of the measurement unit 51 being switched from an idle state to a measurement mode, and a stage S154 of flowchart 150 encompasses the measurement unit 51 measuring the alien cross-talk signal generated on victim cable 30 in response to alien cross-talk couplings 32 between victim cable 30 and disturber cables 31 as the RF test signals are being transmitted over the disturber cables 31 as shown in FIGS. 13–16. A final stage S165 of flowchart 150 encompasses the controller of the measurement unit 61 determining the alien cross-talk on victim cable 31 based on the measured alien cross-talk signal.

Exemplary embodiments of flowcharts 120–150 will now be described herein in connection with FIGS. 17–26 in the context of each test unit 62 shown in FIGS. 13–16 being set in the termination mode prior to receiving a command to transition to either the transmit mode or the listen mode.

Figure 17:
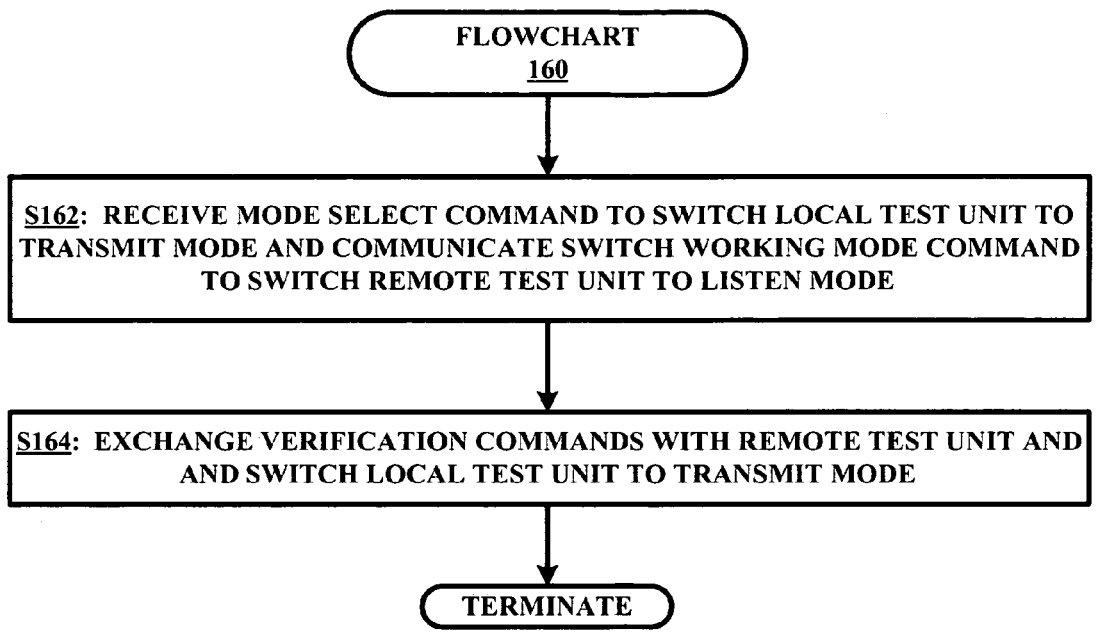
FIG. 17 illustrates a flowchart representative of one embodiment of a manual transmit mode selection method in accordance with the present invention.

FIG. 17 illustrates a flowchart 160 representative of a manual transmit mode selection method of the present invention applicable to test units 62 serving as local test units under near end PSANEXT shown in FIG. 13 and far end PSAFEXT shown in FIG. 14. A stage S162 of flowchart 160 encompasses a controller 94 of the local test unit 62(L) receiving a mode select command via a single press of key 97(1) (FIG. 6) to switch the local test unit 62(L) from the termination mode to the transmit mode and communicating two (2) switch working mode commands "10" to a corresponding remote test unit 62(R) to switch from the termination mode to the transmit mode and then to the listen mode. A stage S164 of flowchart 160 encompasses controller 94 of the local test unit 62(L) exchanging verification commands "11" with the remote test unit 62(R) and switching the local test unit 62(L) to the transition mode.

Figure 18:
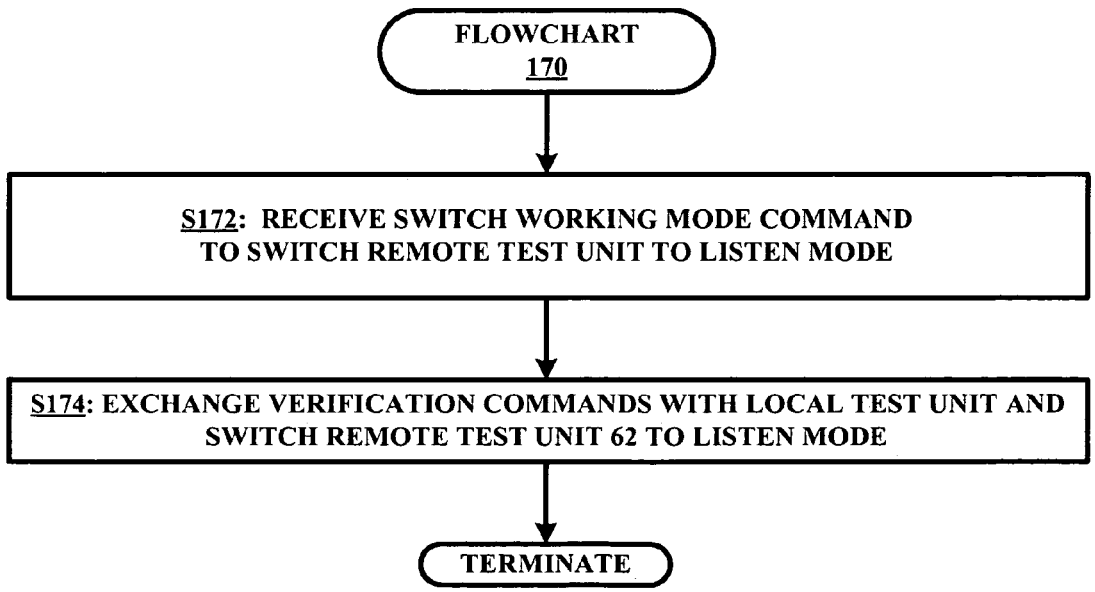
FIG. 18 illustrates a flowchart representative of one embodiment of an automatic listen mode selection method in accordance with the present invention.

FIG. 18 illustrates a flowchart 170 representative of an automatic listen mode selection method of the present invention applicable to test units 62 serving as remote test units under near end PSANEXT shown in FIG. 13 and far end PSAFEXT shown in FIG. 14. A stage S172 of flowchart 170 encompasses a controller 94 of the remote test unit 62(R) receiving the two (2) switch working mode commands "10" from the local test unit 62(L) to switch the remote test unit 62(R) from the termination mode to the transmit mode and then to the listen mode. A stage S174 of flowchart 170 encompasses controller 94 of the remote test unit 62(R) exchanging verification commands "11" with the local test unit 62(L) and switching the remote test unit 62(R) from the termination mode to the transmit mode and then to the listen mode.

Figure 19:
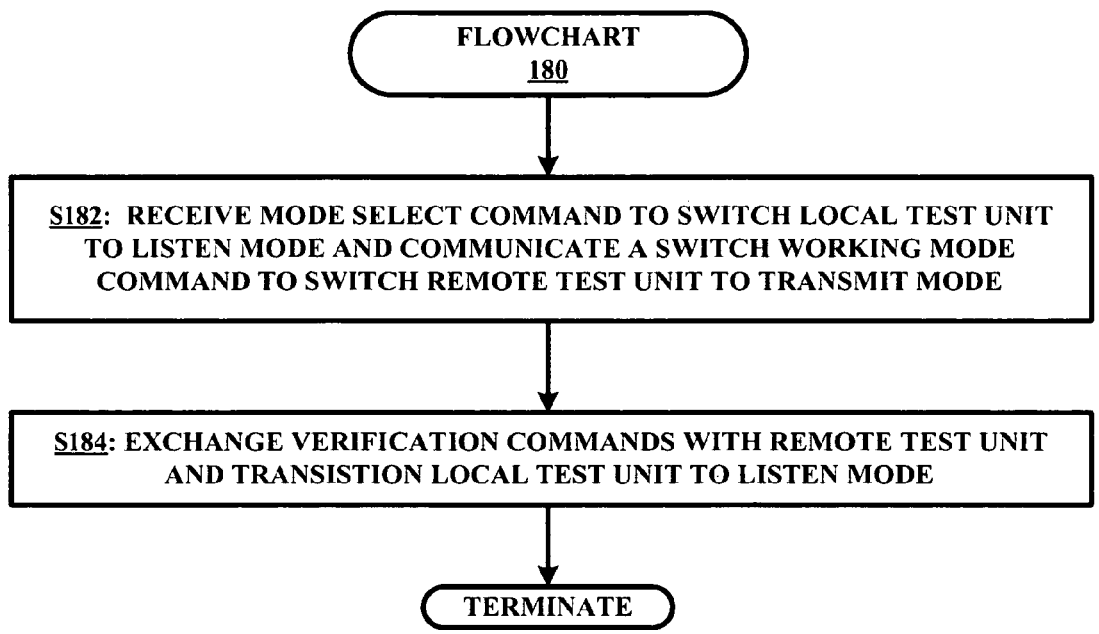
FIG. 19 illustrates a flowchart representative of one embodiment of a manual listen mode selection method in accordance with the present invention.

FIG. 19 illustrates a flowchart 180 representative of a manual listen mode selection method of the present invention applicable to test units 62 serving as local test units under far end PSANEXT shown in FIG. 15 and near end PSAFEXT shown in FIG. 16. A stage S182 of flowchart 180 encompasses a controller 94 of the local test unit 62(L) receiving two (2) mode select commands via a double press of key 97(1) (FIG. 6) to switch the local test unit 62(L) from the termination mode to the transmit mode and then to the listen mode, and communicating a single switch working mode command "10" to a corresponding remote test unit 62(R) to switch from the termination mode to the transmit mode. A stage S184 of flowchart 180 encompasses controller 94 of the local test unit 62(L) exchanging verification commands "11" with the remote test unit 62(R) and switching the local test unit 62(L) to the listen mode.

Figure 20:
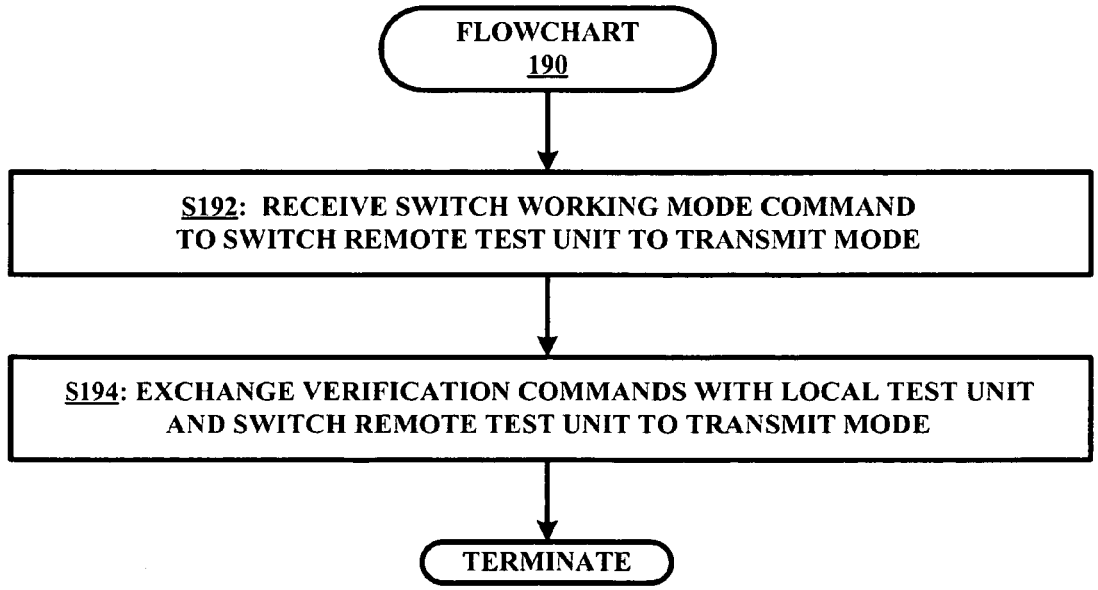
FIG. 20 illustrates a flowchart representative of one embodiment of an automatic transmit mode selection method in accordance with the present invention.

FIG. 20 illustrates a flowchart 190 representative of an automatic transmit mode selection method of the present invention applicable to test units 62 serving as remote test units under far end PSANEXT shown in FIG. 15 and near end PSAFEXT shown in FIG. 16. A stage S1192 of flowchart 190 encompasses a controller 94 of the remote test unit 62(R) receiving the switch working mode command "10" from the local test unit 62(L) to switch the remote test unit 62(R) from the termination mode to the transmit mode. A stage S194 of flowchart 190 encompasses controller 94 of the remote test unit 62(R) exchanging verification commands "11" with the local test unit 62(L) and switching the remote test unit 62(R) from the termination mode to the transmit mode.

Figure 21:
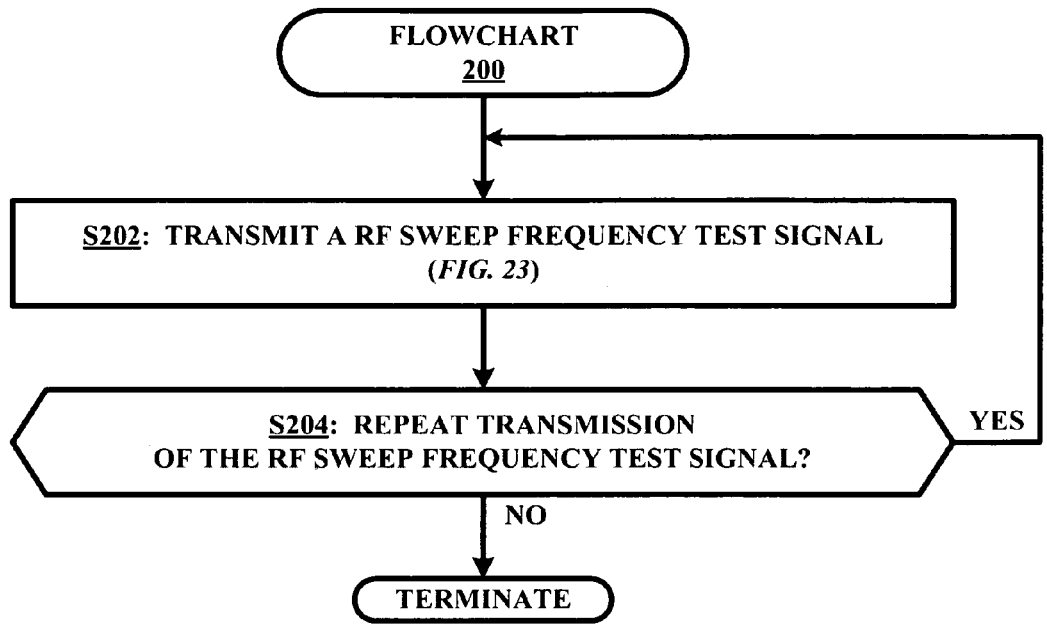
FIG. 21 illustrates a flowchart representative of one embodiment of a RF frequency sweep testing signal transmission method in accordance with the present invention.
Figure 23:
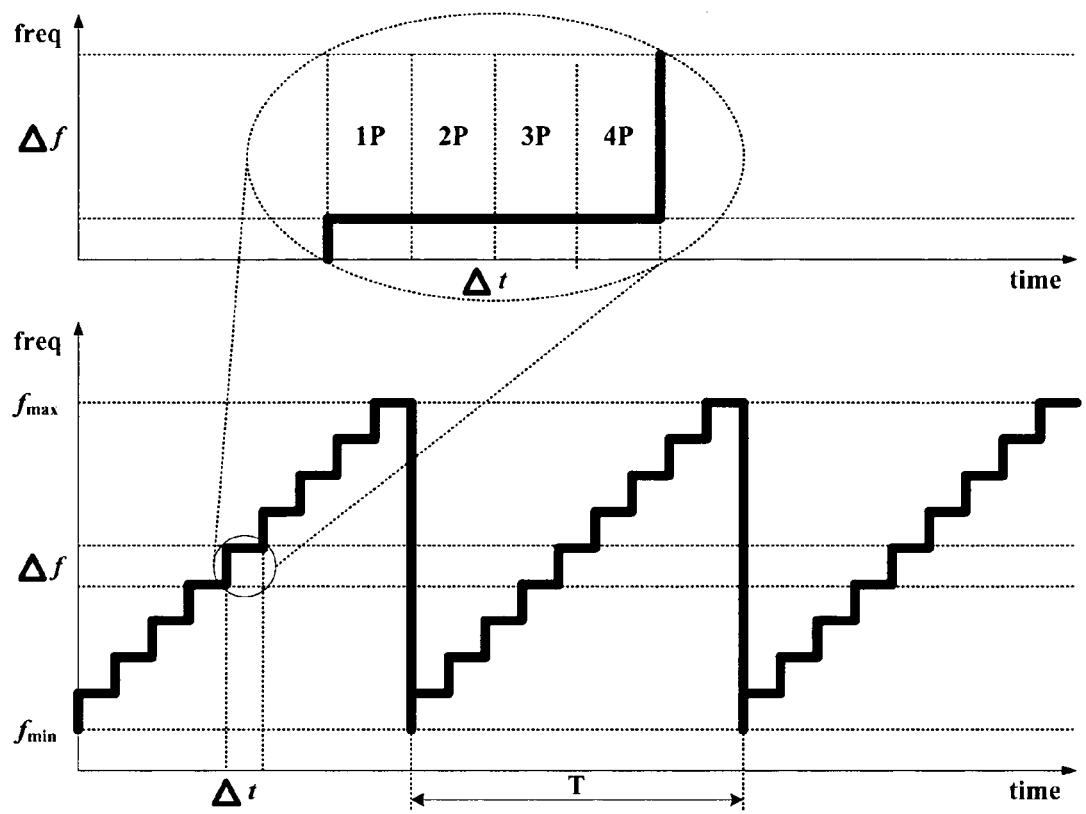
FIG. 23 illustrates one embodiment of a RF frequency sweep test signal in accordance with the present invention.

FIG. 21 illustrates a flowchart 200 representative of a RF frequency sweep test signal transmission method of the present invention as implemented by each test unit 62 shown in FIGS. 13–16 that are switched to the transmit mode. A stage S202 encompasses a controller 94 of a transmit mode test unit 62 controlling a transmission of a RF frequency sweep test signal on the connected disturber cable 31. An exemplary RF frequency sweep test signal as shown in FIG. 23 has a frequency sweep range of $f_{MIN}$ (e.g., 1 MHz) to $f_{MAX}$ (e.g., 1 GHz) over a time period T whereby the frequency of the signal is incrementally increased by a frequency step size $\Delta f$ over each time period $\Delta t$. Furthermore, for a four (4) pair wire, the signal is transmitted to a different wire pair for $\frac{1}{4}\Delta t$ for each frequency step size $\Delta f$ as shown in FIG. 23.

Referring again to FIG. 21, a stage S204 of flowchart 200 encompasses a controller 94 of the transmit mode test unit 62 determining whether to repeat the transmission of the RF frequency sweep test signal on the disturber cable 31 or to terminate flowchart 200. In one embodiment, a determination policy is implemented during stage S204 with the determination policy being based on a recognition that all of the test units 62 set in the transmit mode may or may not be synchronized with measurement units 50 whereby it may be necessary to repeat the transmission for a specific amount of time to ensure proper measurement of the alien cross-talk on victim cable 30.

Figure 22:
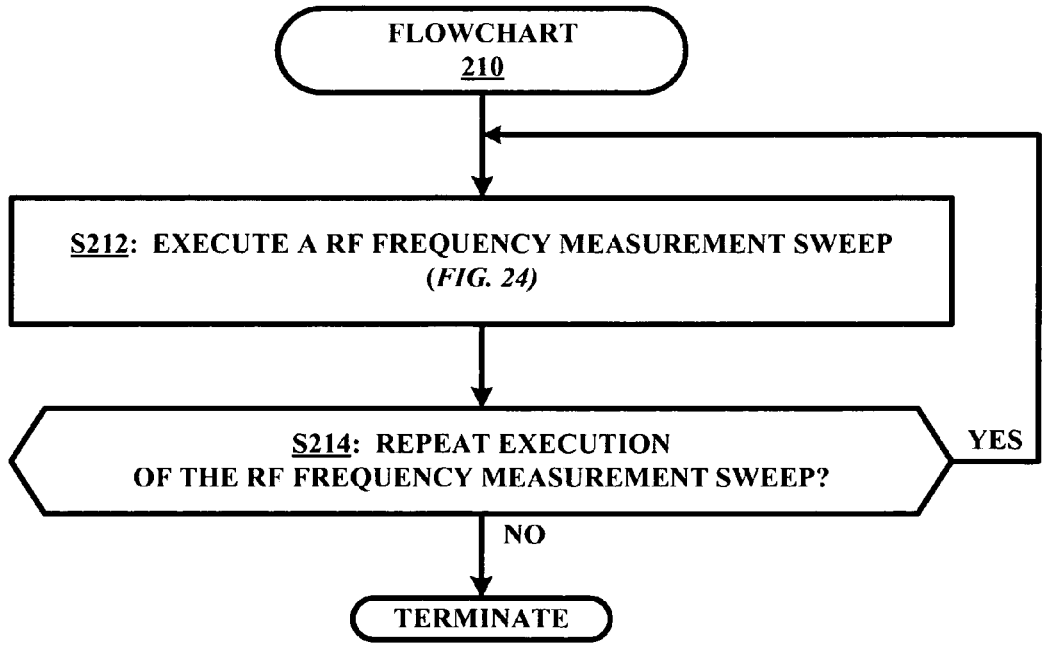
FIG. 22 illustrates a flowchart representative of one embodiment of RF frequency sweep measurement method in accordance with the present invention.

FIG. 22 illustrates a flowchart 210 representative of a RF frequency sweep measurement method of the present invention as implemented by each measurement unit 51 shown in FIGS. 13–16 that are switched to the measurement mode. A stage S212 encompasses the measurement unit 51 executing a RF frequency measurement sweep of victim cable 30. An exemplary RF frequency measurement sweep, of which three (3) steps are shown in FIG. 24, has a frequency sweep range of $f_{MIN}$ (e.g., 1 MHz) to $f_{MAX}$ (e.g., 1 GHz) over a time period xT (x being the number of frequency steps) whereby the frequency of the measurement sweep is incrementally increased by a frequency step size ΔJ over each time period T.

Referring again to FIG. 22, a stage S214 of flowchart 200 encompasses a measuring unit 51 determining whether to repeat the RF frequency measurement sweep on the victim cable 30 or to terminate flowchart 220. In one embodiment, a determination policy is implemented during stage S214 with the determination policy being based on a recognition that all of the test units 62 set in the transmit mode may or may not be synchronized with the measurement unit 51 whereby it may be necessary to repeat the measurement sweep for a specific number of times.

Figure 24:
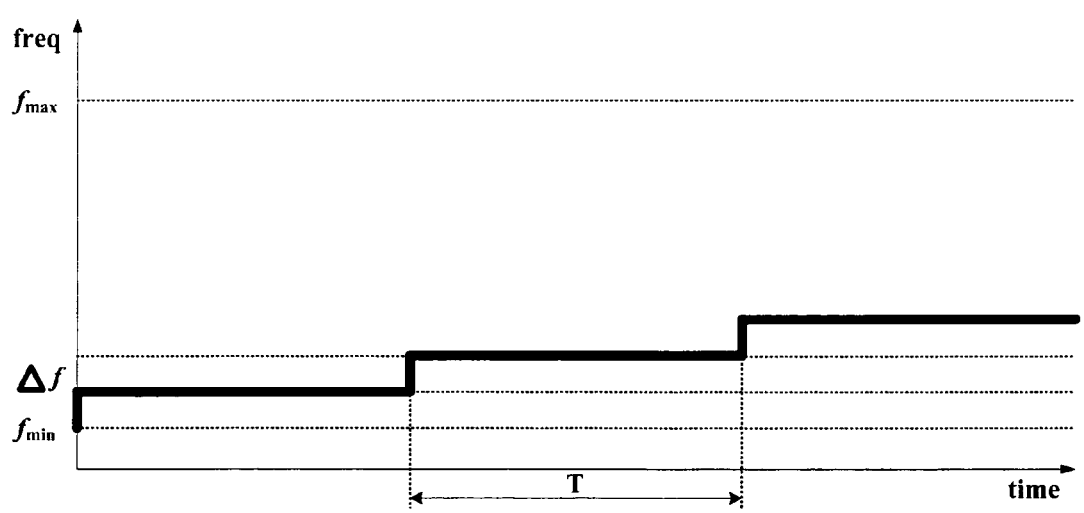
FIG. 24 illustrates one embodiment of a RF frequency measurement sweep in accordance with the present invention.
Figure 25:
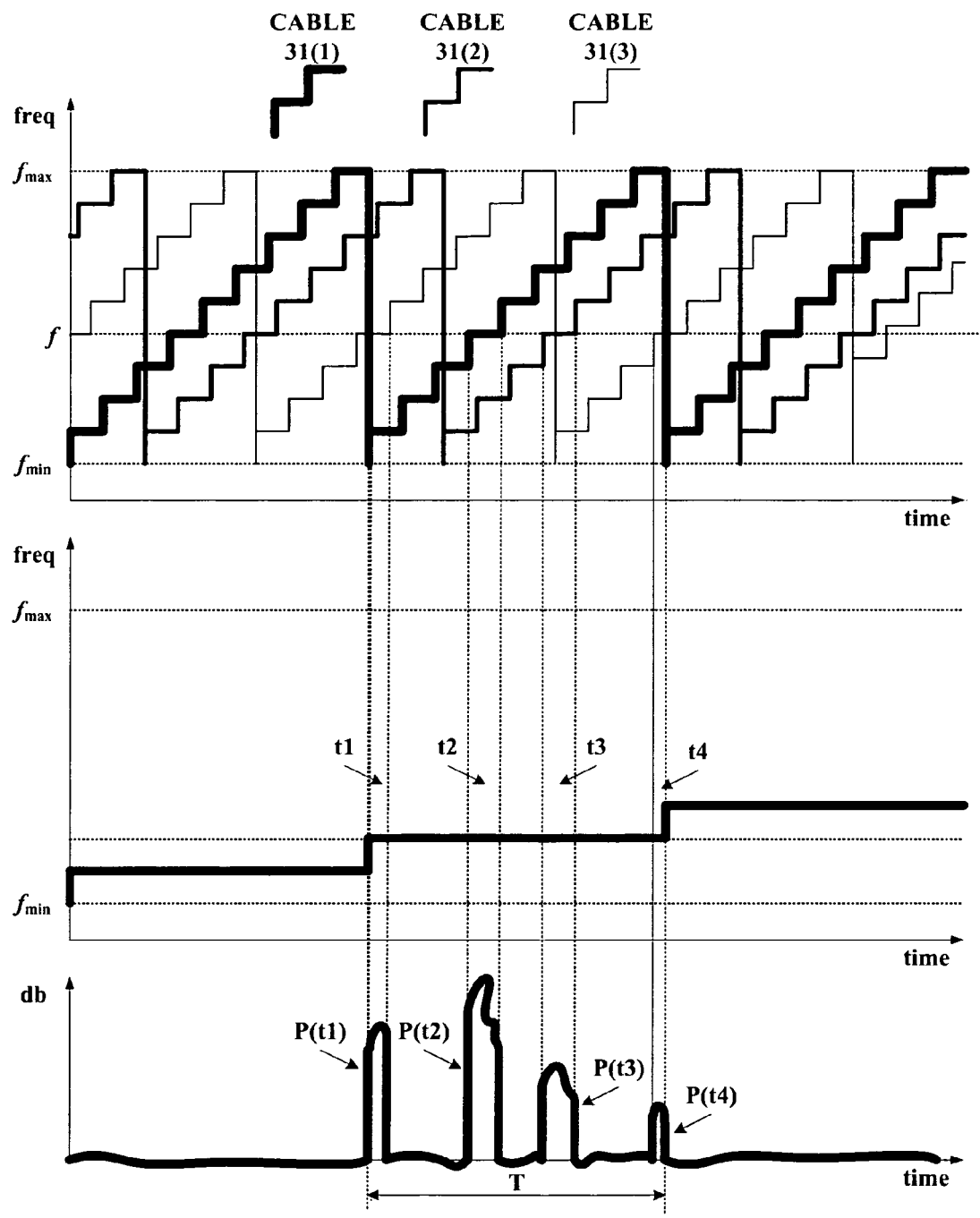
FIG. 25 illustrates an exemplary cross-talk between the RF frequency sweep test signal illustrated in FIG. 23 and the RF frequency measurement sweep illustrated in FIG. 24.

FIG. 25 illustrates an exemplary measurement of an alien cross-talk signal on victim cable in the context of RF frequency sweep test signals of FIG. 23 being simultaneously and asynchronously transmitted on disturber cables 31 and the RF frequency measurement sweep of FIG. 24 being performed on victim cable 30 for a particular frequency f. As shown in FIG. 25 for one of the T periods of the RF frequency measurement sweep, exemplary alien cross-talk data samples P(t1), P(t2), P(t3) and P(t4) in the alien cross-talk signal on victim cable 30 occur during respective time periods t1, t2, t3 and t4. Specifically, alien cross-talk data sample P(t1) is generated in response to the RF frequency sweep test signal on disturber cable 31(3) and the RF frequency measurement sweep on victim cable 30 having frequency f during time period t1 as shown in FIG. 25. Alien cross-talk data sample P(t2) is generated in response to the RF frequency sweep test signal on disturber cable 31(1) and the RF frequency measurement sweep on victim cable 30 having frequency f during time period t2 as shown in FIG. 25. Alien cross-talk data sample P(t3) is generated in response to the RF frequency sweep test signal on disturber cable 31(2) and the RF frequency measurement sweep on victim cable 30 having frequency f during time period t3 as shown in FIG. 25. Alien cross-talk data sample P(t4) is generated in response to the RF frequency sweep test signal on disturber cable 31 (3) and the RF frequency measurement sweep on victim cable 30 having frequency f during time period t4 as shown in FIG. 25. From this description of FIG. 25, those having ordinary skill in the art will appreciate the generation of four (4) alien cross-talk data samples for each frequency of the RF frequency measurement sweep of victim cable 30. Those having ordinary skill in the art will appreciate that each alien cross-talk data sample P can be equally divided into four (4) segments with each segment corresponding to a particular wire pair of victim cable 30. To this end, those having ordinary skill in the are will further appreciate that alien cross-talk data sample P(t1) and alien cross-talk data sample P(t4) both correspond to disturber cable 31(3) and therefore have to be combined as one data sample.

Figure 26:
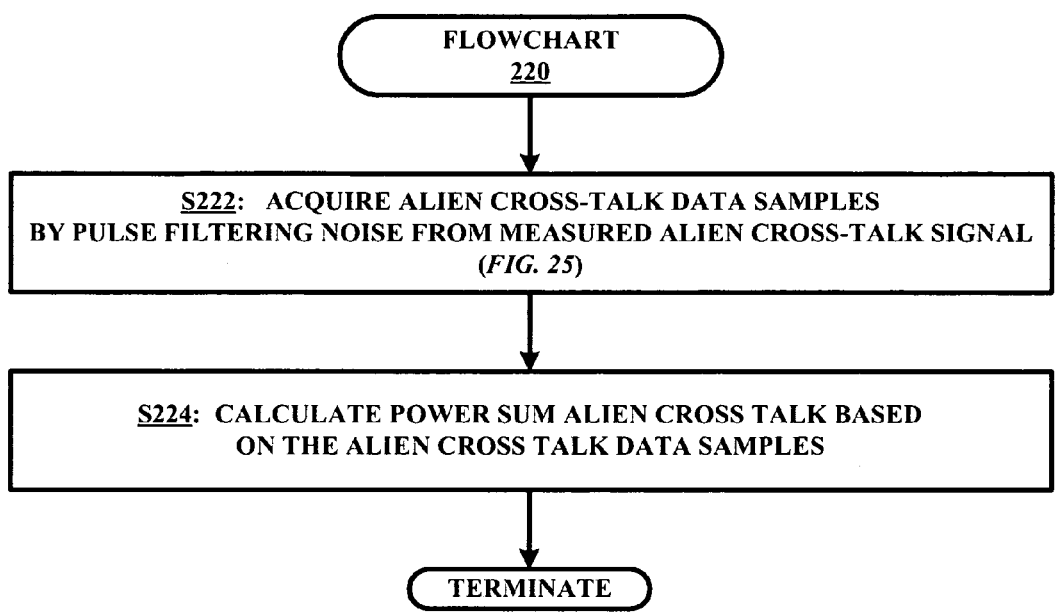
FIG. 26 illustrates a flowchart representative of one embodiment of a powersum alien cross-talk determination method in accordance with the present invention.

FIG. 26 illustrates a flowchart 220 representative of an alien cross-talk determination method of the present invention. A stage S222 of flowchart 220 encompasses a measurement unit 51 acquiring data samples from a measured alien cross-talk signal. These data samples will be first processed to filter measurement noise. This filtering, for example, can be in the form of a threshold filtering, allowing samples with value greater than a pre-defined threshold unchanged while setting the data samples with values below the threshold level to zero. In one embodiment, the threshold filtering is implemented in accordance with the following equation [1]:

$$Pk = Pk' \text{ if } Pk' > Th$$

$$Pk = 0 \text{ if } Pk' < Th \quad [1]$$

where Pk' is kth data sample, Th is pre-determined threshold and Pk is the filtered data sample. For example, as shown in FIG. 25, a threshold filtering of the noise of the measured alien cross-talk signal involves the sampled pulses P(t1)–P(t4) of the alien cross-talk signal exceeding the threshold Th with the remaining noise of the alien cross-talk signal is set to zero. Those having ordinary skill in the art will appreciate the value of the pre-determined TH can be a function of a measured amount of noise on the victim cable absent any alien cross-talk coupling between the victim cable and any disturber cable.

A stage S224 of flowchart 220 encompasses a measurement unit 51 calculating a powersum alien cross-talk on victim cable 30 based on the filtered data samples in the stage 222. In one embodiment, the powersum alien crosstalk PSAXT on victim cable 30 is calculated in accordance with the following equation [2]:

$$PSAXT = \frac{M}{K} \sum_{k=1}^{xK} P_k \quad [2]$$

where M is the number of wire pairs in a cable (for example 4). Pk∈[1, xK] are the filtered data samples per frequency at stage 222; x is the number of frequency steps, K is the total number of data samples acquired in the measurement unit in a duration Δt (corresponding to one frequency step of the test signal as in FIG. 23). The value of K is for example determined by the sampling speed of data acquisition hardware. Duration of one frequency step in the measurement frequency sweep, T, is determined by T=x·Δt. In other words, one frequency step duration for measurement sweep equals entire sweep duration of test sweep.

From the above equation [2], those having ordinary skill in the art will appreciate that a summation of all of the samples of acquired data sample per frequency followed by a division of the total number of samples K per frequency step and a multiple of M provides a straightforward calculation of a powersum alien cross talk for a PSANEXT test or a PSAFEXT test.

Figure 27:
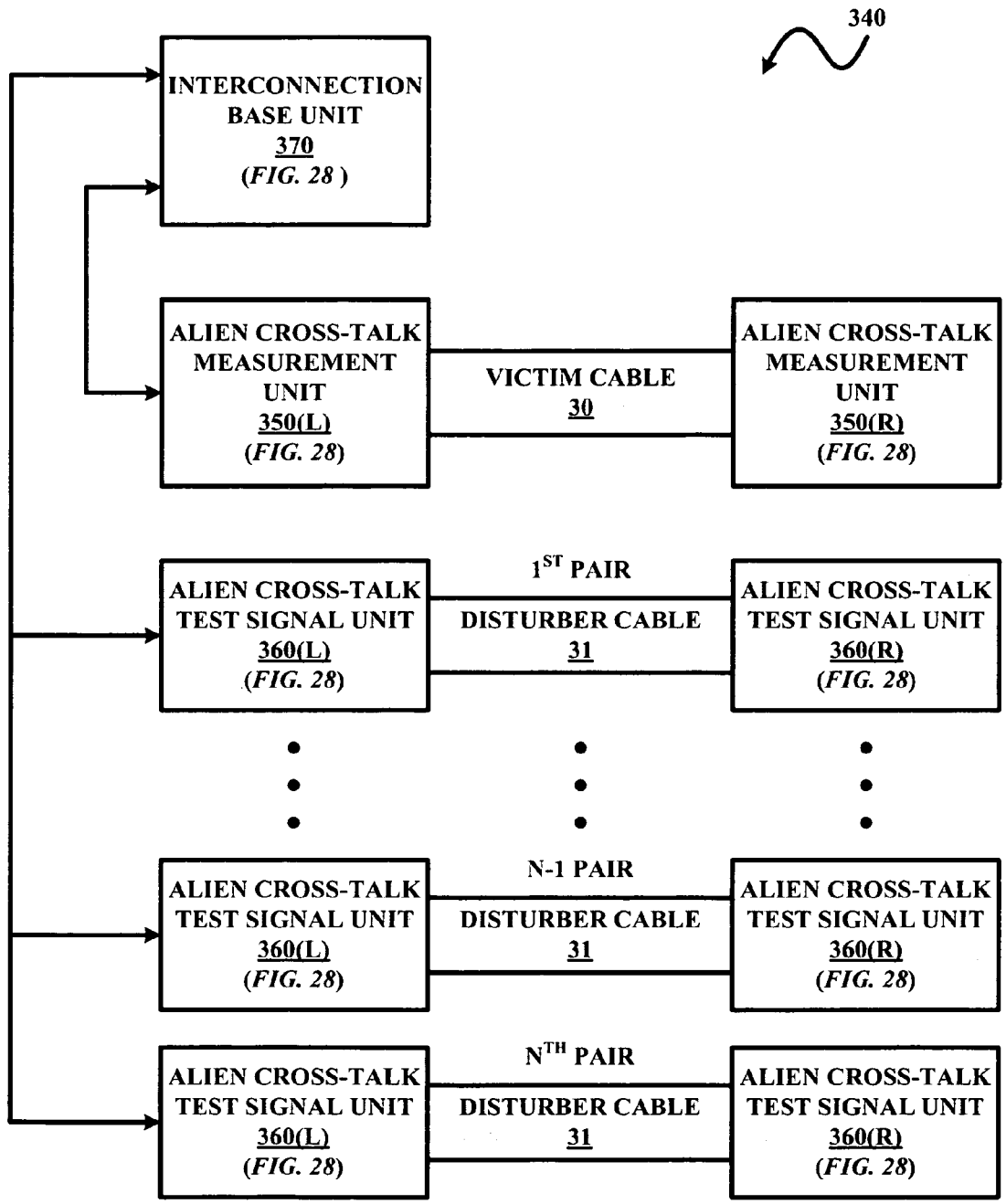
FIG. 27 illustrates a second embodiment of an alien cross-talk test system in accordance with the present invention.

FIG. 27 illustrates an alien cross-talk test system 340 of the present invention employing a local(L)-remote(R) pair of alien cross-talk measurement units 350, a N number of local(L)-remote(R) pairs of alien cross-talk test signal units 360, where N≧1, and an interconnection base unit 370. Generally, cross-talk measurement units 350 are structurally configured to be connected to opposing ends of a victim cable 30 having an M number of wire pairs, and each pair of alien cross-talk test signal units 360 are structurally configured to be connected to opposing ends of a disturber cable 31 having M number of wire pairs, where M≧1. Each pair of alien cross-talk test signal units 360 are further structurally configured to generate an alien cross-talk test signal on one end of connected disturber cable 31 and to terminate the alien cross-talk test signal on the other end of the disturber cable 31. Cross-talk measurement units 350 are further structurally configured to measure an alien cross-talk signal on one end of victim cable 30, and to terminate the alien cross-talk signal on the other end of the victim cable 30. The alien cross-talk signal on victim cable 30 is generated by an alien cross-talk coupling between victim cable 30 and one or more of the disturber cables 31 as an alien cross-talk test signal is being transmitted between corresponding alien cross-talk test signal units 360.

Interconnection base unit 370 controls the transmission of the alien cross-talk test signals on disturbers cables 31 by alien cross-talk test signal units 360 as commanded by local alien cross-talk measurement unit 350(L), in particular a control of non-simultaneous transmission of the alien cross-talk test signals at a same frequency on disturber cables 31. In a near end PSANEXT test or a far end PSAFEXT test, interconnection base unit 370 controls the generation of the alien cross-talk test signals by local alien cross-talk test signal units 360(L) and a termination of the alien cross-talk test signals by remote alien cross-talk test signal units 360(R) as commanded by local alien cross-talk measurement unit 350(L), in particular a control of non-simultaneous generation and termination of the alien cross-talk test signals at a same frequency by alien cross-talk test signal units 360. In a far end PSANEXT test or a near end PSAFEXT test, interconnection base unit 370 controls the termination of the alien cross-talk test signals by local alien cross-talk test signal units 360(L) and the generation of the alien cross-talk test signals by remote alien cross-talk test signal units 360(R) as commanded by local alien cross-talk measurement unit 350(L), in particular a control of non-simultaneous generation and termination of the alien cross-talk test signals at a same frequency by alien cross-talk test signal units 360.

In practice, the present invention does not impose any limitations or any restrictions to the structural embodiments of alien cross-talk measurement units 350, alien cross-talk test signal units 360 and interconnection base unit 370. Thus, the following descriptions of various structural embodiments of alien cross-talk measurement units 350, alien cross-talk test signal units 360 and interconnection base unit 370 in connection with FIGS. 28–41 neither limit nor restrict a scope of structural embodiments of alien cross-talk measurement units 350, alien cross-talk test signal units 360 and interconnection base unit 370.

Figure 28:
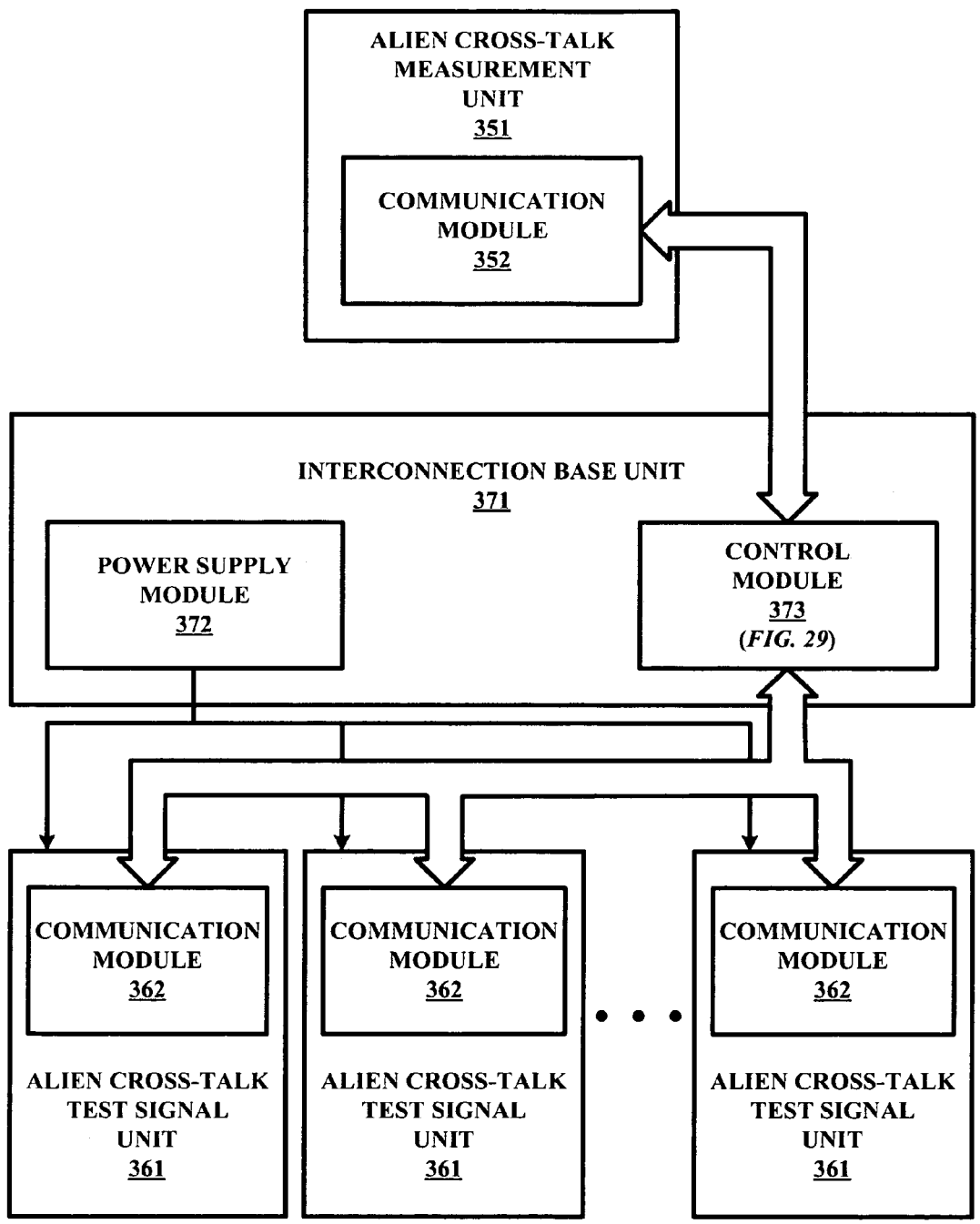
FIG. 28 illustrates one embodiment of various units of the alien cross-talk test system illustrated in FIG. 27 in accordance with the present invention.

FIG. 28 illustrates a general embodiment 351 of alien cross-talk measurement units 350 (FIG. 27), a general embodiment 361 of alien cross-talk test signal units 360 (FIG. 27) and a general embodiment 371 of interconnection base unit 370 (FIG. 27). Alien cross-talk measurement unit 351 is a customized version of alien cross-talk measurement unit 50 (FIG. 1) additionally employing a communication module 352 structurally configured to provide commands to interconnection base unit 371 and to receive status information from interconnection base unit 371. Each alien cross-talk test signal unit 361 is a customized version of alien cross-talk test signal unit 62 (FIG. 3) additionally employing a communication module 362 structurally configured to be responsive to commands issued by interconnection base unit 371 and to provide status information to interconnection base unit 371.

Figure 29:
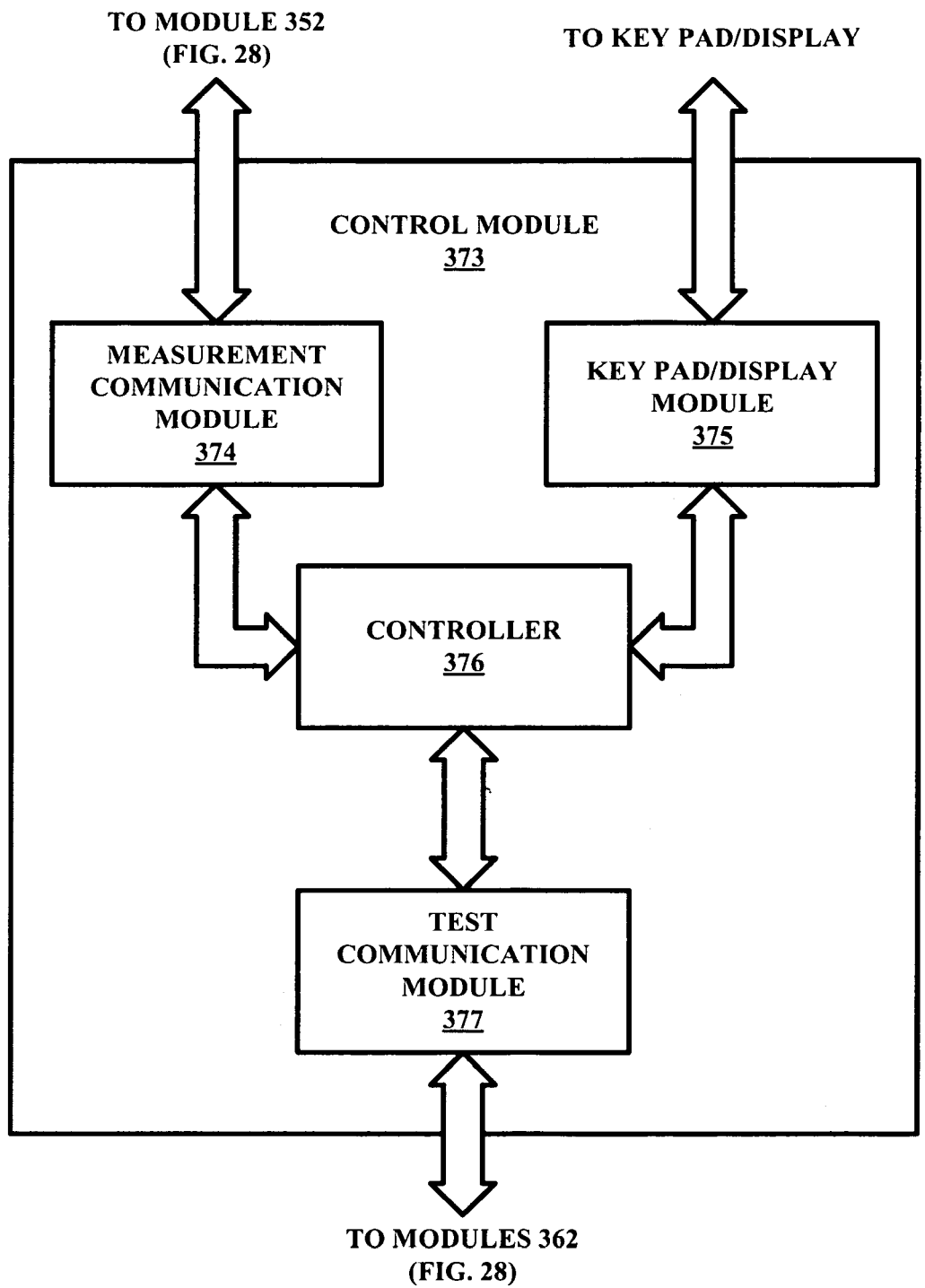
FIG. 29 illustrates on embodiment of a control module illustrated in FIG. 28 in accordance with the present invention.

Interconnection base unit 371 employs a power supply module 372 structurally configured to supply power to all of the alien cross-talk test signal units 361. Interconnection base unit 371 further employs a control module 373 structurally configured to serve as a command interpreting interconnection between communication module 352 and each communication module 362. To this end, in one embodiment as shown in FIG. 29, control module 373 employs a measurement communication module 374, a key pad/display module 375, a controller 376, and a test communication module 377. Measurement communication module 374 is structurally configured to transact commands and status information with communication module 352 of alien cross-talk measurement unit 351. Test communication module 377 is structurally configured to transact commands and status information with the communication modules 362 of alien cross-talk test signal units 361. Controller 376 is structurally configured to interpret (i.e., translate and/or convert) commands from communication module 352 into commands for communication modules 362, and to relay status information from communication modules 362 to communication module 352. Key pad/display module 375 is structurally configured to provide manual commands inputted via a keypad (not shown) and to operate a display (not shown) for showing the working mode of interconnection base unit 371.

Referring again to FIG. 28, a physical interconnection between alien cross-talk measurement unit 351 and interconnection base unit 371 is based on the physical independent nature of the two devices as would be appreciated by those having ordinary skill in the art. An electrical connection between alien cross-talk measurement unit 351 and a panel/jack arrangement of interconnection base unit 371 (e.g., a panel/jack arrangement 378 shown in FIG. 30) can take many forms including, but not limited to, a RJ-45 jacks and normal CAT6/7 cable based scheme, a universal serial bus and USB based scheme, a serial port and cable based scheme and a wireless connection scheme (e.g., Bluetooth).

Figure 30:
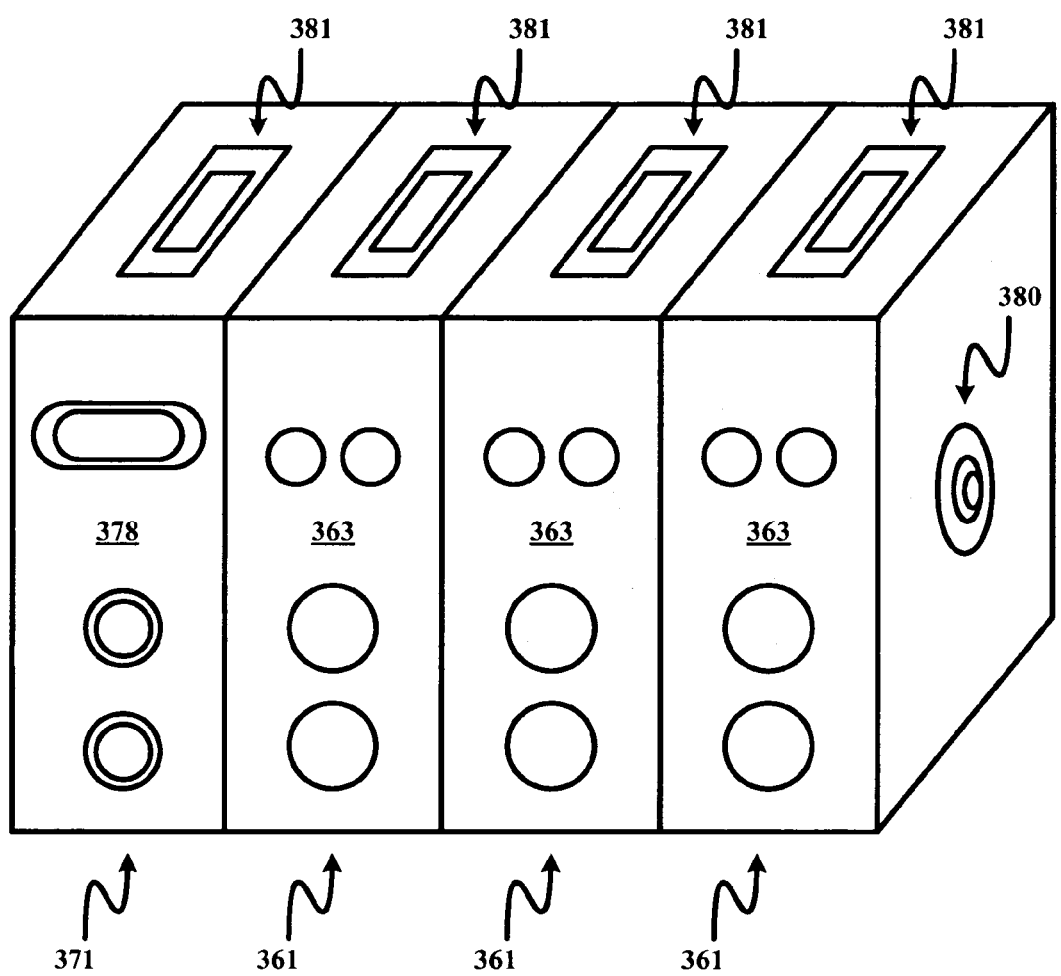
FIG. 30 illustrates a first embodiment of an interconnection between an interconnection base unit and alien cross-talk test signal units in accordance with the present invention.

A physical and electrical interconnection between alien cross-talk test signal units 361 and interconnection base unit 371 is based on the circumstances of a particular testing situation. In one embodiment as illustrated in FIG. 30, a physical interconnection involves a bundling of interconnection base unit 371 and alien cross-talk test signal units 361 via a mechanical connection 380 (e.g., a screw or Velcro ties). Further, an electrical interconnection involves a n-pin head-type connectors 381 or edge connectors whereby a standard n-conductor ribbon cable (not shown) is used for both power signals and control signals. For example, in one possible implementation, n=20 pins whereby two (2) pins are for power supply, one (1) pin is for digital ground, one (1) pin is for trigger and the remaining fourteen (14) pins are for cable identification.

A panel/jack arrangement 363 is for electrically connecting an alien cross-talk test signal unit 361 to a disturber cable 31 under test.

Figure 31:
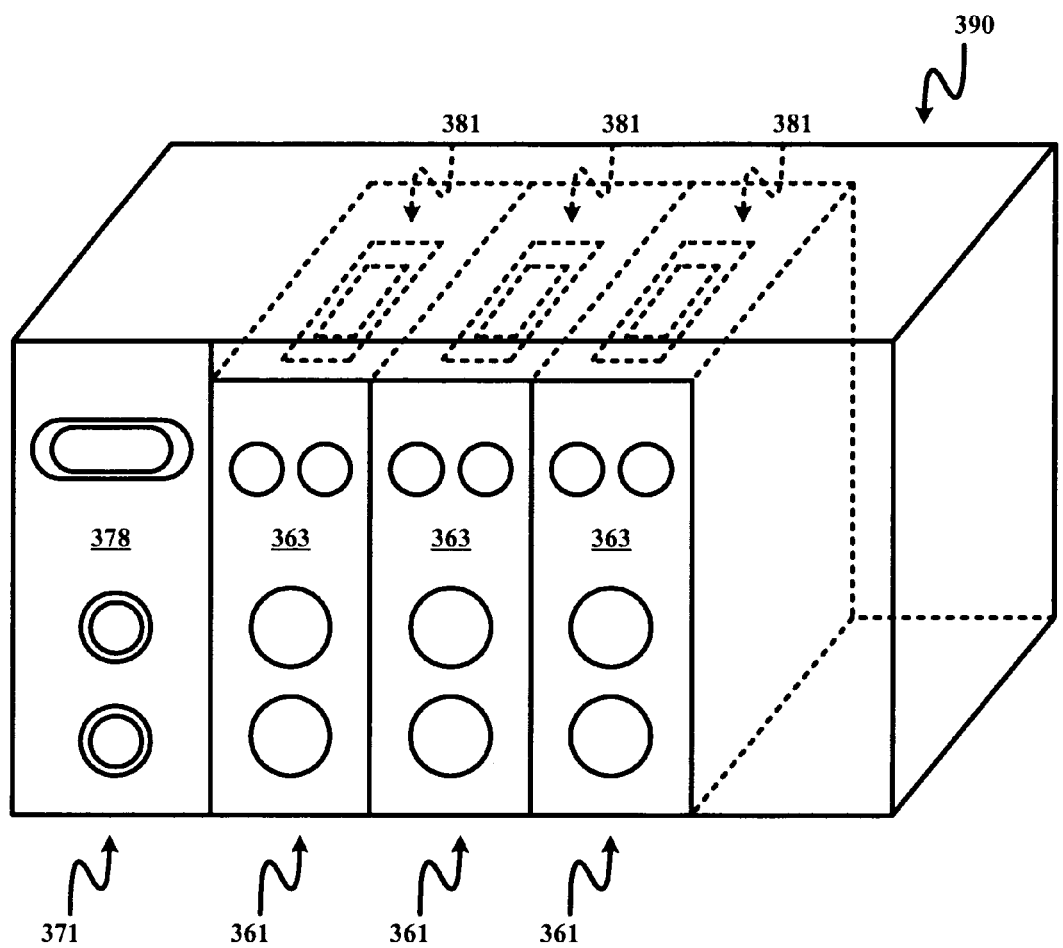
FIG. 31 illustrates a second embodiment of an interconnection between an interconnection base unit and alien cross-talk test signal units in accordance with the present invention.

In a second embodiment illustrated in FIG. 31, a physical interconnection of interconnection base unit 371 and alien cross-talk test units 361 involve a chassis 390 provided with a pre-installation of interconnection base unit 371 and a post-insertion of alien cross-talk test units 361 into slots of chassis 390.

In a third embodiment, chassis 390 is a rack mountable chassis that may be fixed in the same rack as the patch panels under test.

A description of an exemplary alien cross-talk environment will now be provided herein to facilitate an understanding of an additional alien cross-talking testing method in accordance with the present invention. In the exemplary alien cross-talk environment as shown in FIG. 32, the M number of wires pairs for the cables is four (4) and the N number of disturber cables is three (3).

Figure 32:
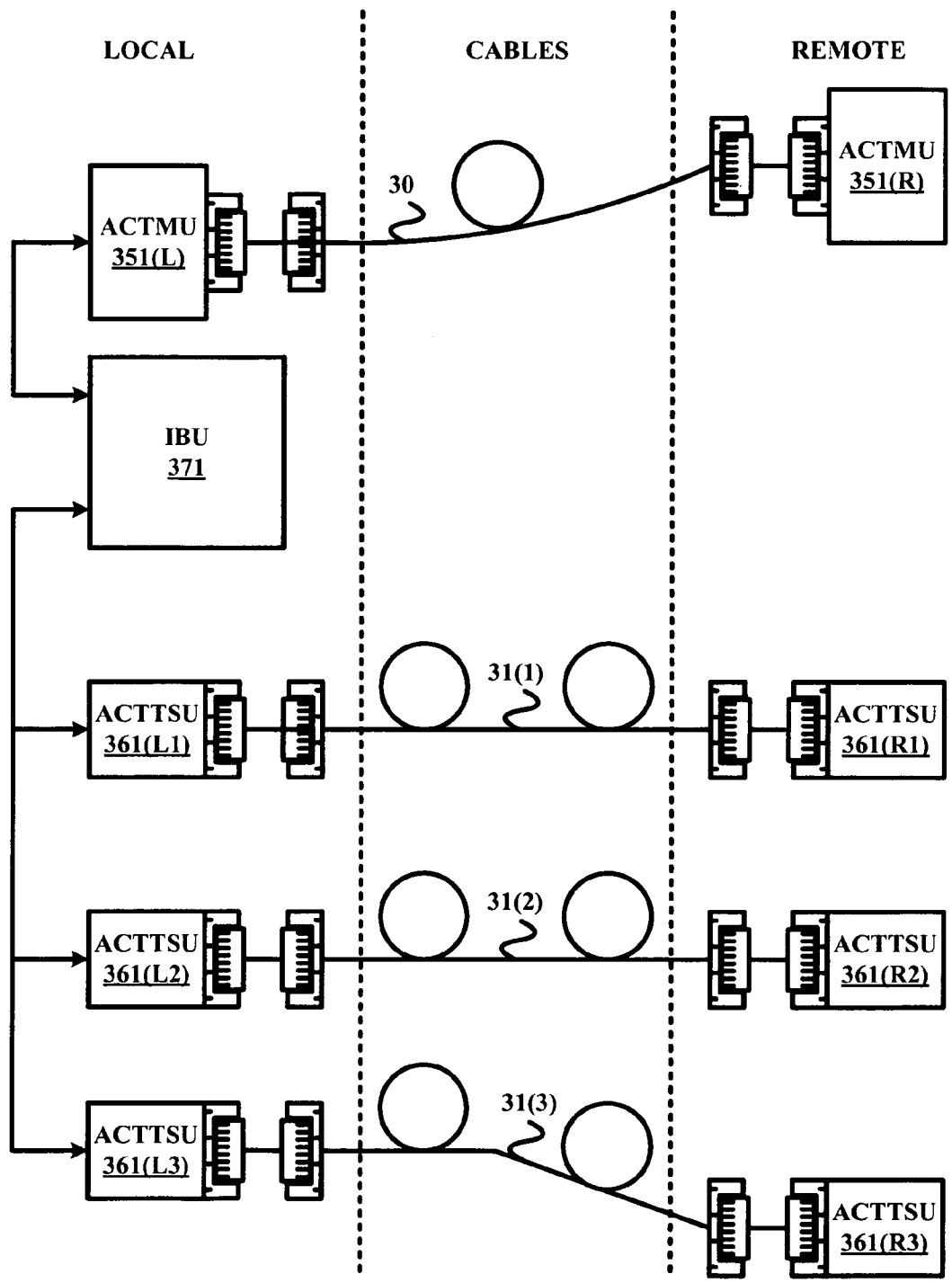
FIG. 32 illustrates one embodiment of the alien cross-talk test system illustrated in FIG. 27 in accordance with the present invention.

Referring to FIG. 32, a local alien cross-talk measurement unit ("ACTMU") 351(L) is connected to one end of victim cable 30 and a remote alien cross-talk measurement unit 351(R) is connected to an opposing end of victim cable 30. In one embodiment, alien cross-talk measurement units 351 are spectrum analyzers (e.g., a WireScope and a DualRemote, respectively, as sold by Agilent) or field cable testers having RJ-45 jacks or equivalent and memories that are programmed with computer code to selectively implement the alien cross-talk termination method in accordance with flowchart 140 illustrated FIG. 11 as previously described herein and alien cross-talk measurement method in accordance with a flowchart 150 illustrated in FIG. 12 as previously described herein.

The three (3) alien cross-talk test signal unit ("ACTTSU") 361 pairings each involve a local alien cross-talk test signal unit 361(L) connected to one end of a disturber cable 31 and a remote alien cross-talk test signal unit 361(R) connected to an opposing end of the disturber cable 31. A controller 94 of each alien cross-talk test signal unit 361 is programmed to selectively implement a RF test signal generation method in accordance with flowchart 120 illustrated FIG. 9 as previously described herein and RF test signal termination method in accordance with flowchart 130 illustrated in FIG. 10 as previously described herein.

Interconnection base unit 371 controls the transmission of RF test signals by alien cross-talk test signal units 361 on disturbers cables 31 as commanded by local cross-talk measurement unit 351(L). To this end, in one embodiment, a communication between local cross-talk measurement unit 351(L) and interconnection base unit 371 via a network cable, USB, serial port or wireless connection is in accordance with the following TABLE 3 that lists types of control commands issued by local cross-talk measurement unit 351(L) to interconnection base unit 371 and feedback provided by interconnection base unit 371 to local cross-talk measurement unit 351(L):

TABLE 3

| | |
|---|---|
| CONTROL COMMANDS | Working status commands for units 361 and unit 371 |
| | Trigger sweep mode commands for units 361 |
| | Power on/off command for units 361 and unit 371 |
| FEEDBACK | Verfication of command execution |
| | Working status information of units 361 and unit 371 |

In one embodiment, communication between alien cross-talk test signal units 361 and interconnection base unit 371 is with n signals via a n-conductor ribbon cable (not shown) or n-signal bus (not shown) that is used for both power signals and control signals. For example, the n signals includes a power supply signal, a common digital ground signal, a communication signal, a trigger signal and a cable identification signal. The power signal supplies power from interconnection base unit 371 to alien cross-talk signal units 361. The communication signal provides working status feedback from alien cross-talk test signal units 361 to interconnection base unit 371, switches alien cross-talk test signal units 361 between operational modes (e.g., between a transmit mode, a termination mode and a listen mode as previously described herein) and other functions as would be appreciated by those having ordinary skill in the art. The trigger signal serves an interrupt signal applicable for communication requests, RF test sweeps and other functions as would be appreciated by those having ordinary skill in the art.

The cable identification signal serves to identify all disturber cables 31 under test. In one embodiment, an identification of a disturber cable 31 is based on an identification of a local alien cross-talk test signal unit 361(L) connecting the disturber cable 31 under test. For example, an identification of a disturber cable 31 is based on an embedded product ID of a local cross-talk test signal unit 361(L) connecting the disturber cable 31 under test. Specifically, the local cross-talk test signal unit 361(L) could inform local cross-talk measurement unit 351(L) of its product ID via interconnection base unit 371 and the corresponding disturber cable 31 can be labeled with the product ID.

Figure 33:
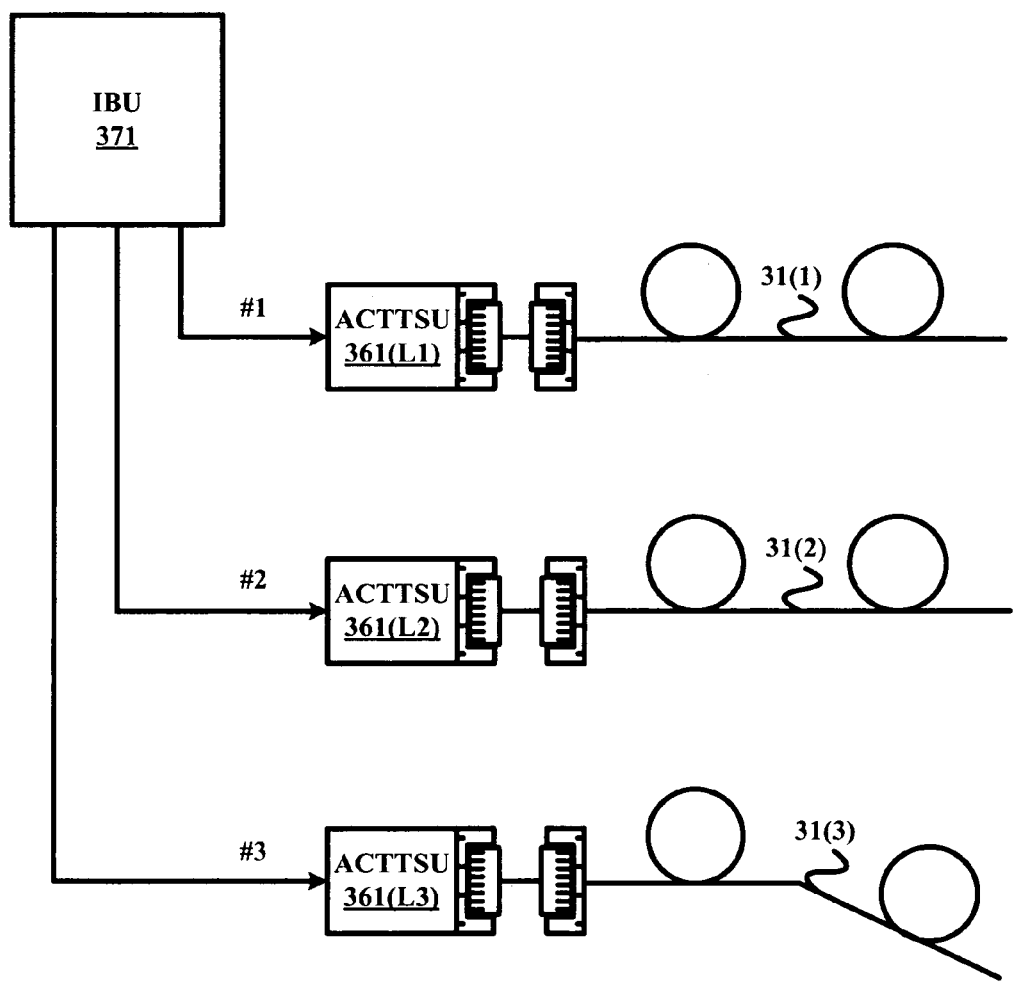
FIG. 33 illustrates one embodiment of a cable identification method in accordance with the present invention.

In another example, an identification of a disturber cable 31 is based on a physical position of a local cross-talk test signal unit 361(L) connecting the disturber cable 31 under test. This example is based on an assigned cable identification pin of a n-conductor ribbon cable, a n-signal bus or the like. Specifically, as illustrated in FIG. 33, local alien cross-talk test signal unit 361(L1) is connected to a cable identification conductor or slot #1 whereby local alien cross-talk test signal unit 361(L1) provides an enable signal on the cable identification conductor or slot #1 that is sensed and recorded as cable identification #1 by interconnection base unit 371, which automatically identifies and labels disturber cable 31(1) as the #1 disturber cable. From there, interconnection base unit 371 provides the cable number identification to local alien cross-talk measurement unit 351(L), which uses the cable number identification for testing purposes (e.g., start/stop of RF test signal transmission of disturber cable 31 (1) and display of testing results of disturber cable 31 (1)). Additionally, the cable identification signal can be used as an enable signal for communication and other purposes.

This is repeated for local cross-talk test signal units 361(L2) and 361(L3) as shown.

Figure 34:
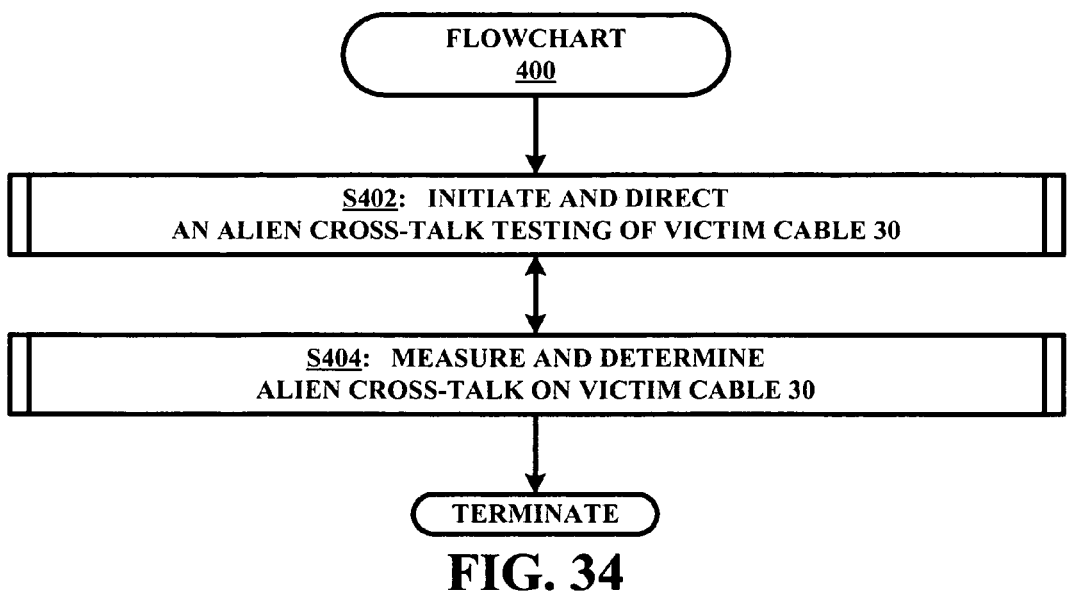
FIG. 34 illustrates a flowchart representative of a second embodiment of an alien cross-talk measurement method in accordance with the present invention.
Figure 35:
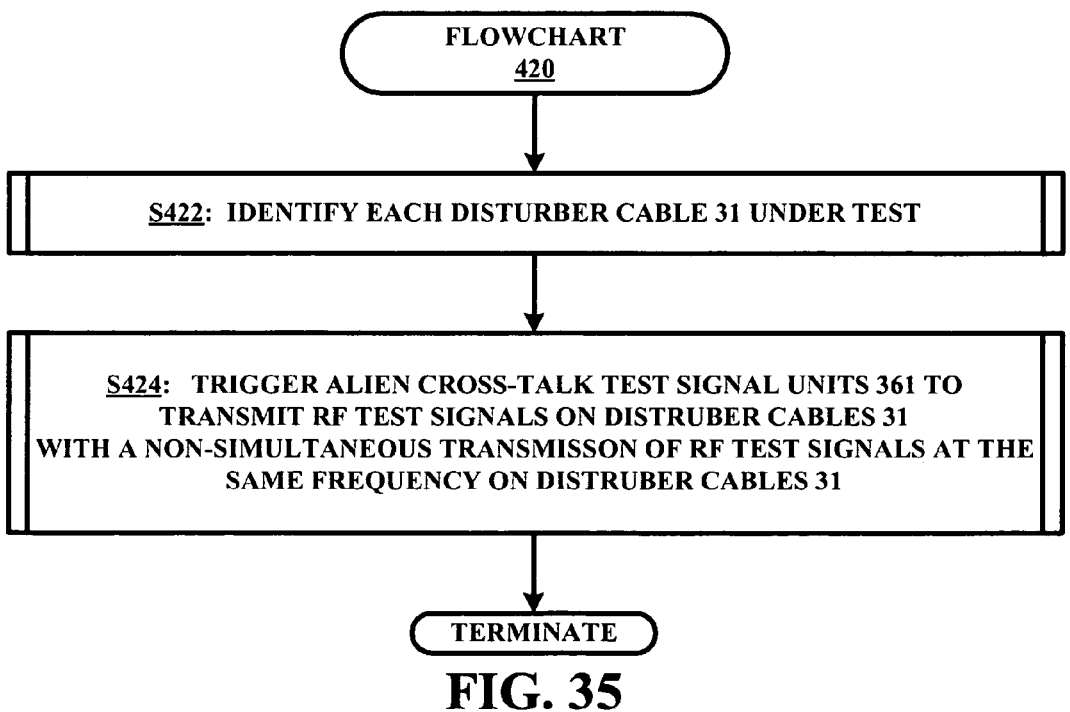
FIG. 35 illustrates a flowchart representative of one embodiment of an interconnection control method in accordance with the present invention.

Generally, in operation, local alien cross-talk measurement unit 351(L) implements a flowchart 400 as illustrated in FIG. 34 and interconnection base unit 371 implements a flowchart 420 as illustrated in FIG. 35.

A stage S402 of flowchart 400 encompasses local alien cross-talk measurement unit 351(L) initiating an alien cross-talk testing of victim cable 30. The initiation of an alien cross-talk testing of victim cable 30 by local alien cross-talk measurement unit 351(L) is accomplished via the appropriate commands to interconnection base unit 371 as will be further explained herein.

A stage S404 of flowchart 400 encompasses local alien cross-talk measurement unit 351(L) switching to a measurement mode to measure and determine an alien cross-talk on victim cable 30. This is accomplished in accordance with flowchart 210 (FIG. 22) and flowchart 220 (FIG. 26) as previously described herein.

Local alien cross-talk measurement unit 351(L) can operate between stages S402 and S404 to direct the alien cross-talk testing of victim cable 30 via the appropriate commands to interconnection base unit 371 as will be further explained herein.

A stage S422 of flowchart 430 encompasses interconnection base unit 371 identifying each disturber cable 31 under test. This is accomplished via the cable identification signal as previously described herein.

A stage S424 of flowchart 430 encompasses interconnection base unit 371 triggering alien cross-talk test signal units 361 to transmit RF test signals on disturber cables 31 with a non-simultaneous transmission of RF test signals at the same frequency on disturber cables 31 as commanded by local alien cross-talk measurement unit 351(L).

The following description of two exemplary alien cross-talk testing schemes derived from flowcharts 400 and 420 reveal the benefits derived from interconnection base unit 371 in controlling a non-simultaneous transmission of RF test signals at the same frequency on disturber cables 31 as would be appreciated by those having ordinary skill in the art.

Figure 36:
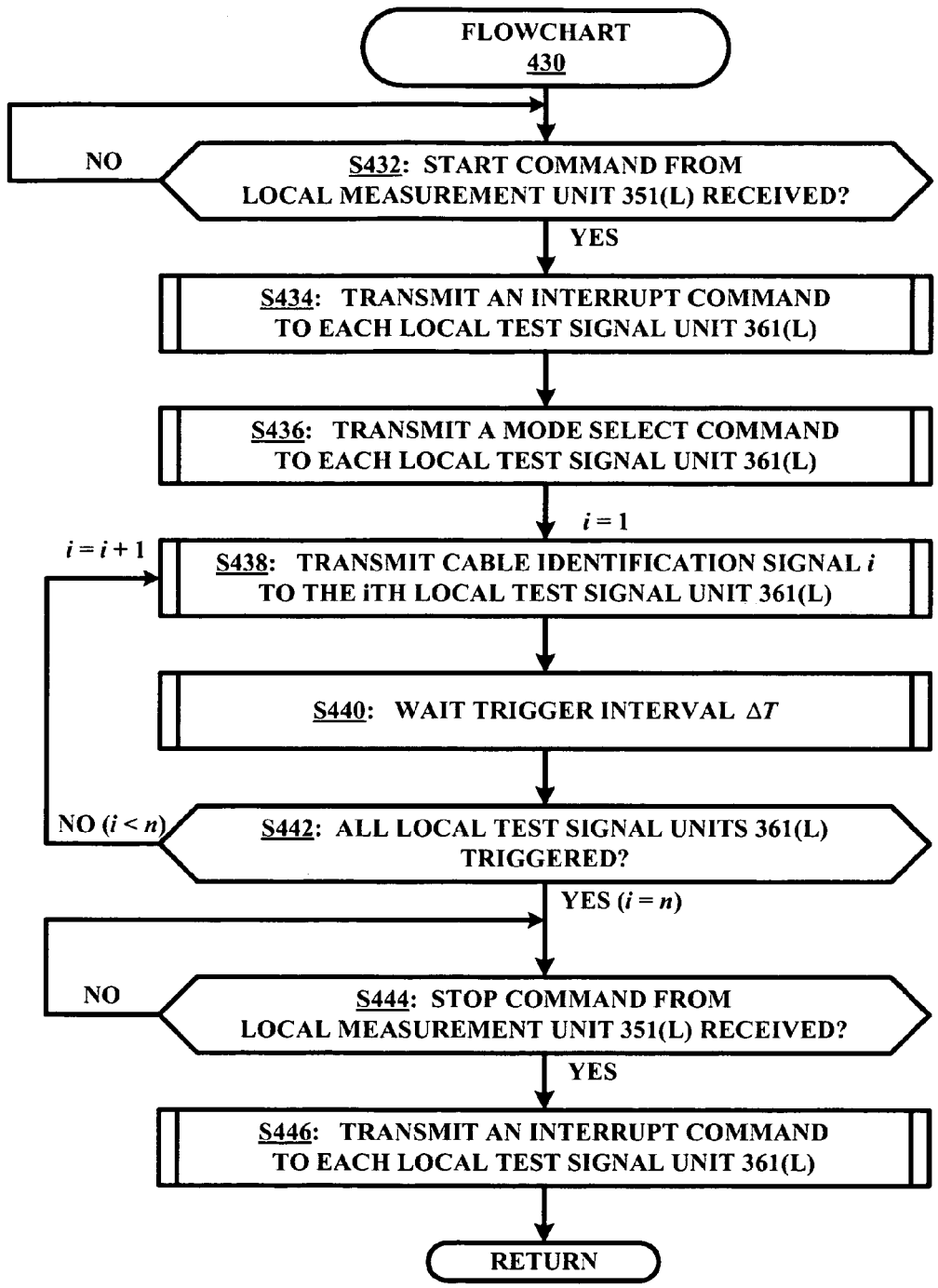
FIG. 36 illustrates a flowchart representative of a first embodiment of non-simultaneous transmission control method in accordance with the present invention.

FIG. 36 illustrates a flowchart 430 representative of a continuous alien cross-talk testing schemes as implemented by interconnection base unit 371. Specifically, this scheme is based on triggering continuous period sweep patterns of RF test signals (e.g., the sweep pattern shown in FIG. 23) at a trigger interval defined for controlling non-simultaneous transmission of RF test signals at the same frequency on disturber cables 31.

Referring to FIGS. 32 and 36, a stage 432 of flowchart 430 encompasses interconnection base unit 371 waiting to receive a start command from local alien cross-talk measurement unit 351(L). In response to receiving the start command, interconnection base unit 371 proceeds to a stage S434 of flowchart 400 to transmit an interrupt test command to each local alien cross-talk test signal units 361(L) to establish communication between interconnection base unit 371 and local alien cross-talk test signal units 361(L). In response thereto, local alien cross-talk test signal units 361(L) switch themselves to the termination mode.

A stage S436 of flowchart 400 encompasses interconnection base unit 371 transmitting a mode select command to local alien cross-talk test signal units 361(L). The mode select command informs local alien cross-talk test signal units 361(L) whether the alien cross-talk testing is a near end PSANEXT test, a far end PSAFEXT test, a far end PSANEXT test or a near end PSAFEXT test. In response thereto, each local alien cross-talk test signal unit 361(L) primes itself to implement flowchart 160 (FIG. 17) as previously described herein or flowchart 180 (FIG. 19) as previously described herein in response to receiving its cable identification signal from interconnection base unit 371.

Figure 37:
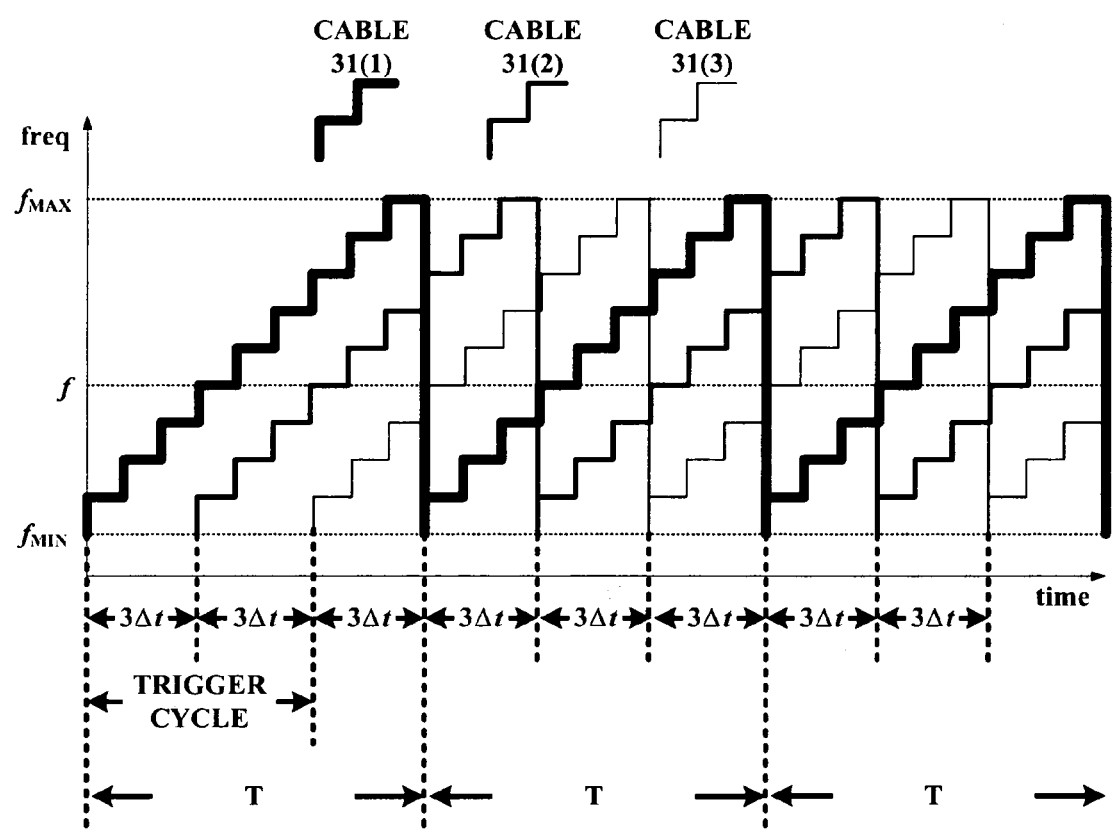
FIG. 37 illustrates exemplary RF test signals generated by the flowchart illustrated in FIG. 36 in accordance with the present invention.

A stage S438 of flowchart 400 encompasses interconnection base unit 371 transmitting cable identification signal #1 to local alien cross-talk test signal unit 361(L1). In response thereto, for a near end PSANEXT test or a far end PSAFEXT test, local alien cross-talk test signal unit 361(L1) implements flowchart 160 to switch itself from the termination mode to the transmit mode and to direct remote alien cross-talk test signal unit 361 (R1) to transition itself from the termination mode to the listen mode per flowchart 170 (FIG. 18). As a result, local alien cross-talk test signal unit 361(L1) controls a transmission of a RF test signal on disturber cable 31(1) in accordance with flowchart 200 (FIG. 21), such as, for example, the RF test signal on disturber cable 31(1) as illustrated in FIG. 37.

For a far end PSANEXT test or a near end PSAFEXT test, local alien cross-talk test signal unit 361(L1) implements flowchart 180 to switch itself from the termination mode to the listen mode and to direct remote alien cross-talk test signal unit 361(R1) to transition itself from the termination mode to the transmit mode per flowchart 190 (FIG. 20). As a result, remote alien cross-talk test signal unit 361(R1) controls a transmission of a RF test signal on disturber cable 31(1), such as, for example, the RF test signal on disturber cable 31(1) as illustrated in FIG. 37.

A stage S440 of flowchart 400 encompasses interconnection base unit 371 waiting a trigger interval ΔT before transmitting cable identification signal #2 to local alien cross-talk test signal unit 361(L2). To ensure a non-simultaneous transmission of a RF test signal on disturber cable 31(1) and disturber cable 31(2) at the same frequency, trigger interval ΔT must be greater than time period Δt as previously described herein in connection with FIG. 23, such as, for example, trigger interval ΔT being equal to 3Δt as shown in FIG. 37.

Upon expiration of trigger interval ΔT, interconnection base unit 371 returns to stage S438 in accordance with a stage S442 of flowchart 400 to transmit cable identification number #2 to local alien cross-talk test signal unit 361(L2). In response thereto, for a near end PSANEXT test or a far end PSAFEXT test, local alien cross-talk test signal unit 361 (L2) implements flowchart 160 to switch itself from the termination mode to the transmit mode and to direct remote alien cross-talk test signal unit 361(R2) to transition itself from the termination mode to the listen mode per flowchart 170 (FIG. 18). As a result, local alien cross-talk test signal unit 361(L2) controls a transmission of a RF test signal on disturber cable 31(2) in accordance with flowchart 200 (FIG. 21), such as, for example, the RF test signal on disturber cable 31(2) as illustrated in FIG. 37.

For a far end PSANEXT test or a near end PSAFEXT test, local alien cross-talk test signal unit 361(L2) implements flowchart 180 to switch itself from the termination mode to the listen mode and to direct remote alien cross-talk test signal unit 361(R2) to transition itself from the termination mode to the transmit mode per flowchart 190 (FIG. 20). As a result, remote alien cross-talk test signal unit 361(R2) controls a transmission of a RF test signal on disturber cable 31(2), such as, for example, the RF test signal on disturber cable 31(2) as illustrated in FIG. 37.

Interconnection base unit 371 again proceeds to stage S440 to wait trigger interval ΔT. To ensure a non-simultaneous transmission of a RF test signal on disturber cable 31(2) and disturber cable 31(3) at the same frequency, trigger interval ΔT must be greater than time period Δt as previously described herein in connection with FIG. 23, such as, for example, trigger interval ΔT being equal to 3Δt as shown in FIG. 37.

Upon expiration of trigger interval ΔT, interconnection base unit 371 returns to stage S438 in accordance with stage S442 to transmit cable identification number #3 to local alien cross-talk test signal unit 361(L3). In response thereto, for a near end PSANEXT test or a far end PSAFEXT test, local alien cross-talk test signal unit 361(L3) implements flowchart 160 to switch itself from the termination mode to the transmit mode and to direct remote alien cross-talk test signal unit 361(R3) to transition itself from the termination mode to the listen mode per flowchart 170 (FIG. 18). As a result, local alien cross-talk test signal unit 361 (L3) controls a transmission of a RF test signal on disturber cable 31(3) in accordance with flowchart 200 (FIG. 21), such as, for example, the RF test signal on disturber cable 31(3) as illustrated in FIG. 37.

For a far end PSANEXT test or a near end PSAFEXT test, local alien cross-talk test signal unit 361(L3) implements flowchart 180 to switch itself from the termination mode to the listen mode and to direct remote alien cross-talk test signal unit 361(R3) to transition itself from the termination mode to the transmit mode per flowchart 190 (FIG. 20). As a result, remote alien cross-talk test signal unit 361(R3) controls a transmission of a RF test signal on disturber cable 31(3), such as, for example, the RF test signal on disturber cable 31(3) as illustrated in FIG. 37.

Interconnection base unit 371 again proceeds to stage S440 to wait trigger interval ΔT. Upon expiration of trigger interval ΔT, interconnection base unit 371 is to proceed to a stage S444 of flowchart 400 in accordance with stage S442. Proceeding to stage S444 represents a completion of a trigger cycle RF test signal transmission triggers on disturber cables 31, such as, for example, the trigger cycle of RF test signal transmissions triggers on disturber cables 31 as shown in FIG. 37. During stage S444, interconnection base unit 371 waits to receive a stop command from local alien cross-talk measurement unit 351(L).

Prior to receiving the stop command, the alien cross-talk test signal units 361(L) continue to control the RF test signal transmissions triggers on disturber cables 31 as shown in FIG. 7 whereby one of alien cross-talk measurement units 351 is concurrently executing flowchart 210 (FIG. 22) and flowchart 220 (FIG. 26) to determine the alien cross-talk on victim cable 30. Those having ordinary skill in the art will appreciate a non-simultaneous transmission of a RF test signal on disturber cable 31(3) and on disturber cable 31(1) at the same frequency is achieved in view of the trigger interval ΔT also being less than time period T minus time period Δt as previously described herein in connection with FIG. 23, such as, for example, trigger interval ΔT being equal to T−3Δt as shown in FIG. 37.

In response to receiving the stop command, interconnection base unit 371 proceeds to a stage S446 of flowchart 400 to transmit an interrupt test command to each local alien cross-talk test signal units 361(L) to terminate the transmissions of the RF test signals on the disturber cables 31, and then returns to stage S432 to await a new start command from local alien cross-talk measurement unit 351(L).

Referring to FIGS. 32, 36 and 37, it is not imperative to the execution of flowchart 430 that interconnection base unit 371 know the actual number of disturber cables 31 under test despite the fact that interconnection base unit 371 will transmit n cable identification signals for each cycle of flowchart 430, because the trigger interval ΔT is designed to ensure non-simultaneous transmissions of RF test signals on disturber cables 31 irrespective of whether the actual number of disturber cables 31 is less than or equal to the n cable identification signals.

Figure 38:
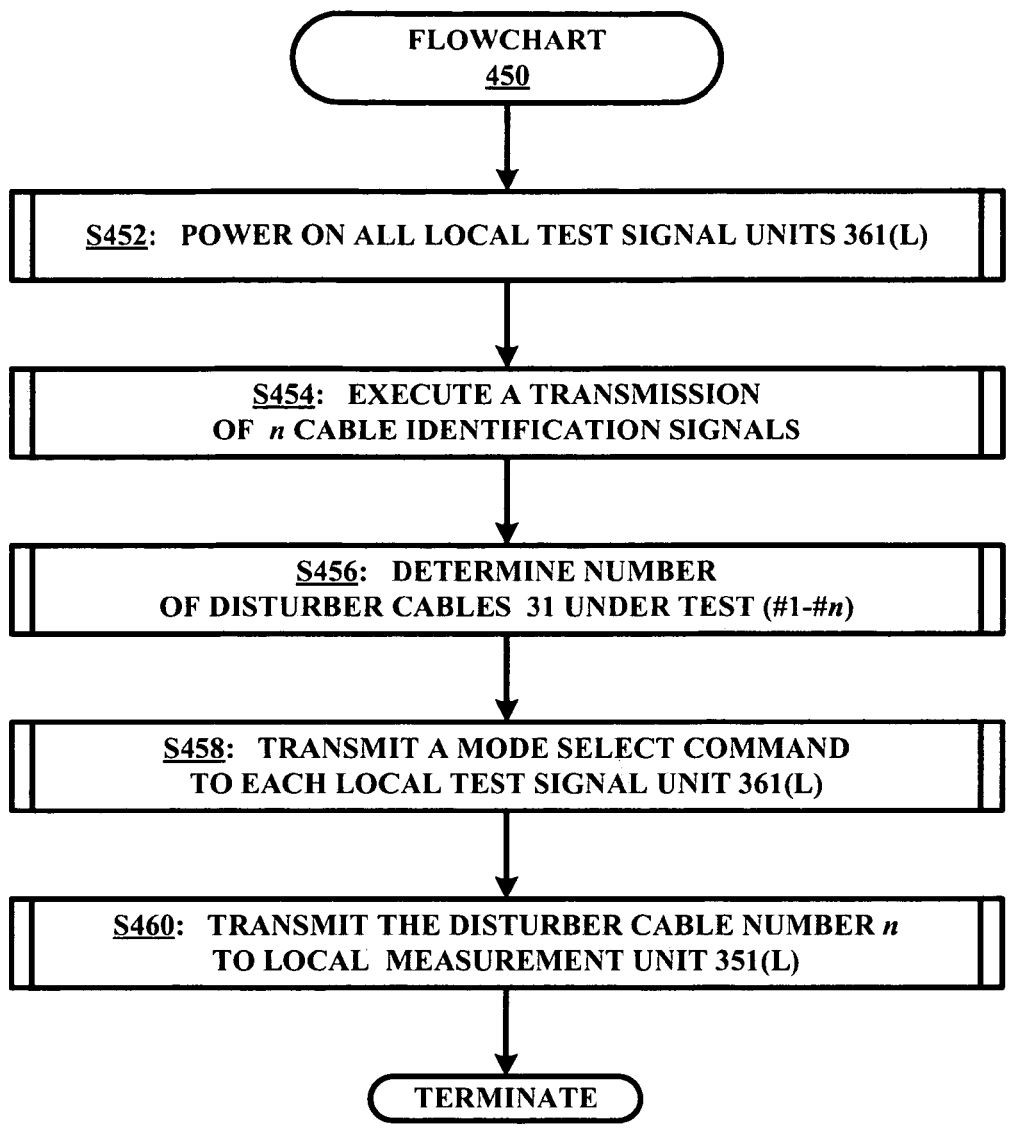
FIG. 38 illustrates a flowchart representative of one embodiment of a cable identification method in accordance with the present invention.
Figure 39:
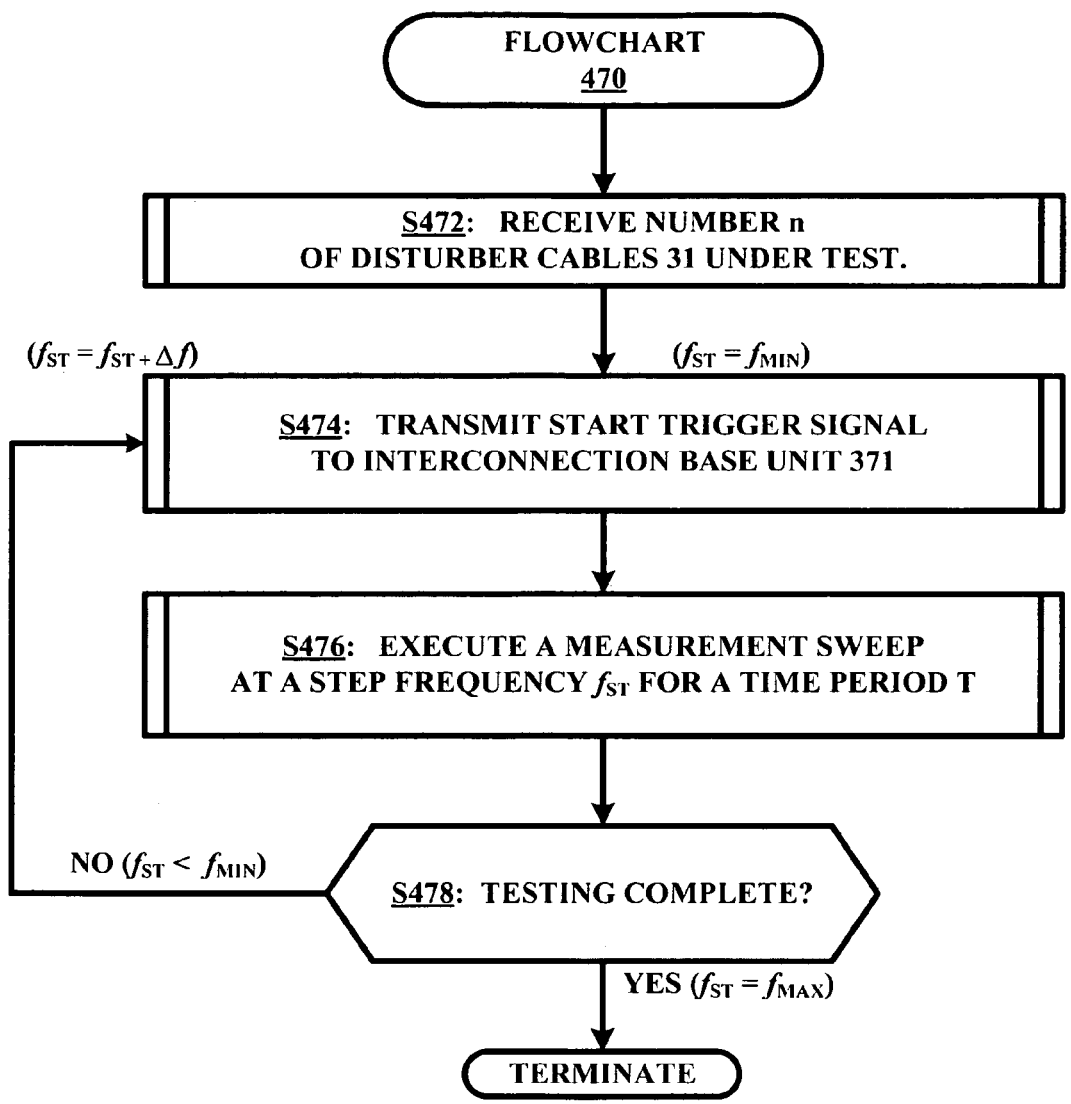
FIGS. 39 and 40 illustrate flowcharts representative of a second embodiment of non-simultaneous transmission control method in accordance with the present invention.
Figure 40:
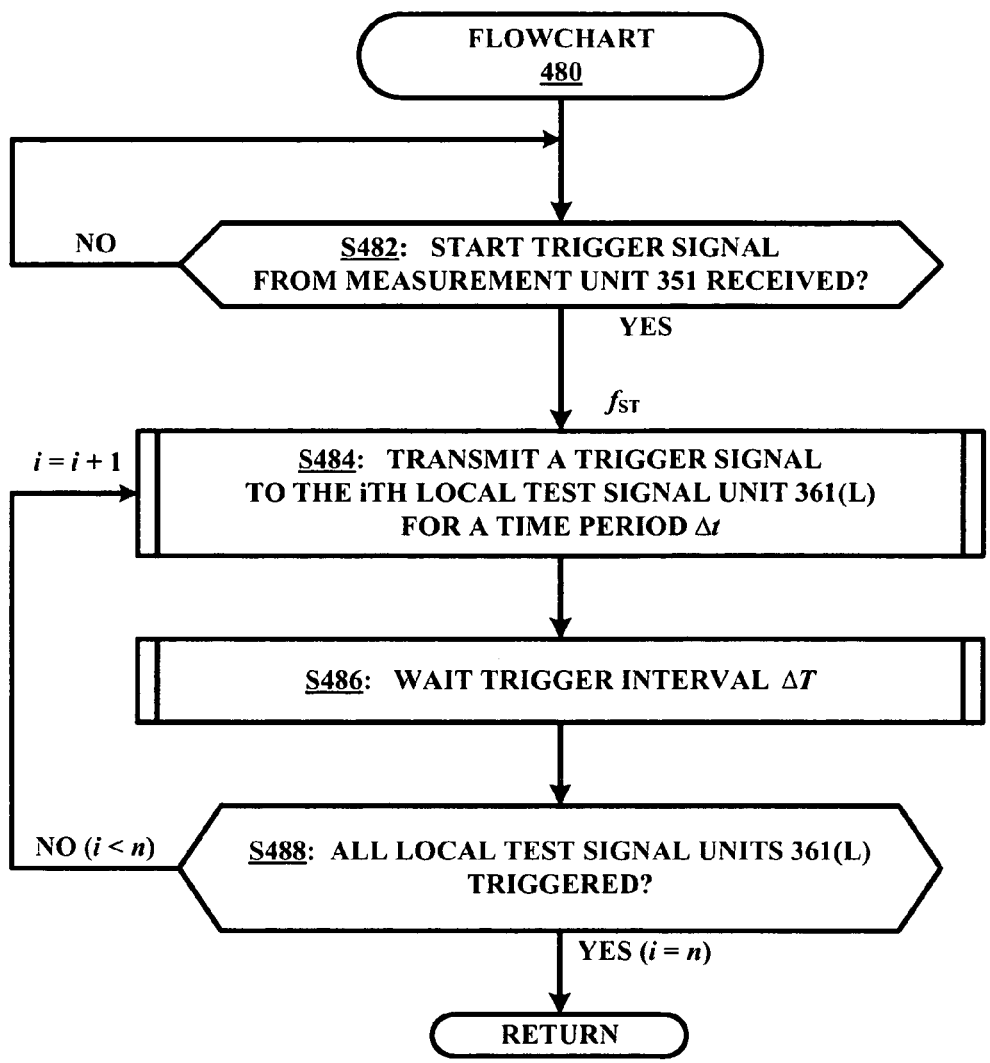

FIGS. 39 and 40 illustrate a flowchart 470 and a flowchart 480, respectively, representative of a pulsed alien cross-talk testing schemes as implemented by local alien cross-talk measurement unit 351(L) and interconnection base unit 371. Specifically, this scheme is based on triggering each frequency step of periodic sweep patterns of RF test signals (e.g., the sweep pattern shown in FIG. 23) at a trigger interval defined for controlling non-simultaneous transmission of RF test signals at the same frequency on disturber cables 31. Under this scheme, it is imperative to the execution of flowcharts 470 and 480 that both local alien cross-talk measurement unit 351 and interconnection base unit 371 know the actual number of disturber cables 31 under test as will be further explained herein. Thus, prior to executing flowcharts 470 and 480, interconnection base unit 371 executes a flowchart 450 as show in FIG. 38 that is representative of a cable identification method of the present invention.

Referring to FIGS. 32 and 38, a stage S452 of flowchart 450 encompasses interconnection base unit 371 powering on all local alien cross-talking test signal units 361(L). A stage S454 of flowchart 450 encompasses interconnection base unit 371 executing a transmission of n cable identification signals. In response thereto, the three (3) local alien cross-talking test signal units 361(L) will obtain their respective cable identifications of #1, #2 and #3 as shown in FIG. 33.

A stage S456 of flowchart 450 encompasses interconnection base unit 371 determining the number and identity of disturber cables 31 under test by sensing the enablement of cable identifications of #1, #2 and #3 and the non-enablement of the remaining cable identifications.

A stage S458 of flowchart 450 encompasses interconnection base unit 371 transmitting mode select commands to local alien cross-talk test signal units 361 analogous to stage S436 previously described herein.

A stage S460 of flowchart 450 encompasses interconnection base unit 371 transmitting the number n of disturber cable 31 under test to local alien cross-talk measurement unit 351(L). In this case, n=3.

Figure 41:
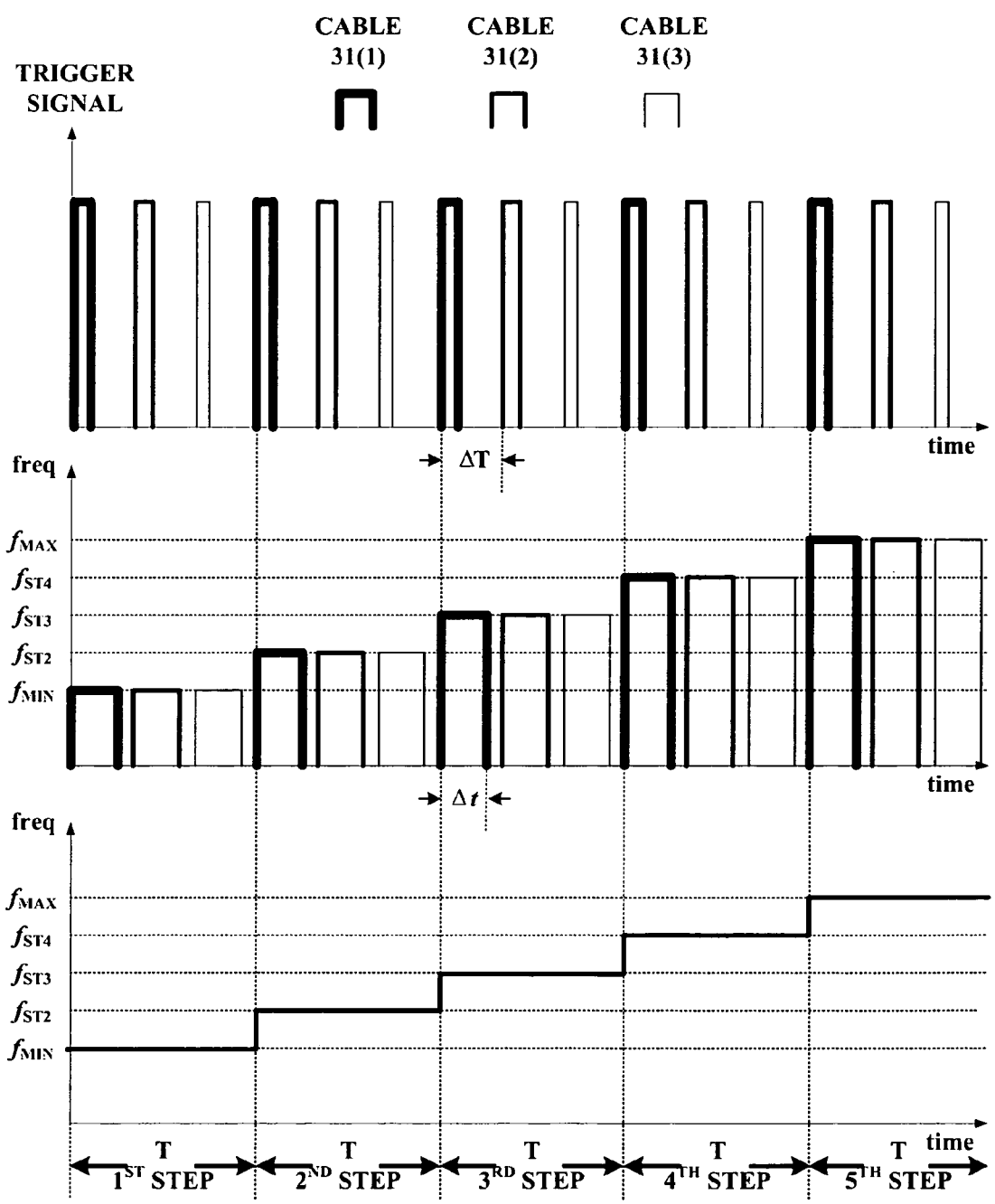
FIG. 41 illustrates exemplary RF test signals generated by the flowcharts illustrated in FIGS. 39 and 40 in accordance with the present invention.

Referring to FIGS. 32 and 39, upon receiving the number n of disturber cable 31 under test during a stage S472 of flowchart 470, local alien cross-talk measurement unit 351(L) sequentially proceeds to a stage S472 of flowchart 470 to transmit a start trigger signal to interconnection base unit 371 with an indication of a step frequency $f_{ST}$ and a stage S474 to either execute a measurement sweep of victim cable 30 at step frequency $f_{ST}$ for a time period T or direct remote alien cross-talk measurement unit 351(R) to execute a measurement sweep of victim cable 30 at step frequency $f_{ST}$ for a time period T. This first frequency step of stages S472 and S474 has step frequency $f_{ST}$ set to being set to a minimum frequency $f_{MIN}$, such as, for example, as shown in FIG. 41.

Referring additionally to FIG. 40, upon receiving the start trigger signal during a stage S482 of flowchart 480, interconnection base unit 371 proceeds to a stage S484 to transmit a trigger signal to local alien cross-talk test signal unit 361(L1) for a time period Δt. In response thereto, for a near end PSANEXT test or a far end PSAFEXT test, local alien cross-talk test signal unit 361(L1) implements flowchart 160 to switch itself from the termination mode to the transmit mode and to direct remote alien cross-talk test signal unit 361(R1) to transition itself from the termination mode to the listen mode per flowchart 170 (FIG. 18). As a result, local alien cross-talk test signal unit 361(L1) controls a transmission of a RF test signal on disturber cable 31(1) at the step frequency $f_{ST}$ of $f_{in}$ in accordance with flowchart 200 (FIG. 21) for time period Δt during the 1$^{st}$ step cycle, such as, for example, the RF test signal on disturber cable 31 (1) for time period Δt at the step frequency $f_{ST}$ of $f_{in}$ during the 1$^{st}$ step cycle as illustrated in FIG. 41.

For a far end PSANEXT test or a near end PSAFEXT test, local alien cross-talk test signal unit 361(L1) implements flowchart 180 to switch itself from the termination mode to the listen mode and to direct remote alien cross-talk test signal unit 361(R1) to transition itself from the termination mode to the transmit mode per flowchart 190 (FIG. 20). As a result, remote alien cross-talk test signal unit 361(R1) controls a transmission of a RF test signal on disturber cable 31 (1) at the step frequency $f_{ST}$ of $f_{in}$ for time period Δt during the 1$^{st}$ step cycle, such as, for example, the RF test signal on disturber cable 31 (1) at the step frequency $f_{ST}$ of $f_{in}$ for time period Δt during the 1$^{st}$ step cycle as illustrated in FIG. 41.

A stage S486 of flowchart 480 encompasses interconnection base unit 371 waiting a trigger interval ΔT before transmitting the trigger signal to local alien cross-talk test signal unit 361(L2) for time period Δt. To ensure a non-simultaneous transmission of a RF test signal on disturber cable 31(1) and disturber cable 31(2) at the same frequency, trigger interval ΔT must be greater than time period Δt yet as close to time period Δt as possible (i.e., ΔT=kit where k→+1).

Upon expiration of trigger interval ΔT, interconnection base unit 371 returns to stage S484 in accordance with a stage S488 of flowchart 480 to transmit the trigger signal to local alien cross-talk test signal unit 361(L2) for time period Δt. In response thereto, for a near end PSANEXT test or a far end PSAFEXT test, local alien cross-talk test signal unit 361(L2) implements flowchart 160 to switch itself from the termination mode to the transmit mode and to direct remote alien cross-talk test signal unit 361(R2) to transition itself from the termination mode to the listen mode per flowchart 170 (FIG. 18). As a result, local alien cross-talk test signal unit 361(L2) controls a transmission of a RF test signal on disturber cable 31(2) at the step frequency $f_{ST}$ of $f_{in}$ in accordance with flowchart 200 (FIG. 21) for time period Δt during the $1^{st}$ step cycle, such as, for example, the RF test signal on disturber cable 31(2) at the step frequency $f_{ST}$ of $f_{in}$ for time period Δt during the $1^{st}$ step cycle as illustrated in FIG. 41.

For a far end PSANEXT test or a near end PSAFEXT test, local alien cross-talk test signal unit 361(L2) implements flowchart 180 to switch itself from the termination mode to the listen mode and to direct remote alien cross-talk test signal unit 361(R2) to transition itself from the termination mode to the transmit mode per flowchart 190 (FIG. 20). As a result, remote alien cross-talk test signal unit 361(R2) controls a transmission of a RF test signal on disturber cable 31(2) at the step frequency $f_{ST}$ of $f_{in}$ for time period Δt during the $1^{st}$ step cycle, such as, for example, the RF test signal on disturber cable 31(2) at the step frequency $f_{ST}$ of $f_{in}$ for time period Δt during the $1^{st}$ step cycle as illustrated in FIG. 41.

Interconnection base unit 371 again proceeds to stage S486 to wait trigger interval ΔT. To ensure a non-simultaneous transmission of a RF test signal on disturber cable 31(2) and disturber cable 31(3) at the same frequency, trigger interval ΔT must be greater than time period Δt yet be as close as possible to for time period Δt.

Upon expiration of trigger interval ΔT, interconnection base unit 371 returns to stage S484 in accordance with stage S488 to transmit cable the trigger signal to local alien cross-talk test signal unit 361(L3) for time period Δt during the $1^{st}$ step cycle. In response thereto, for a near end PSANEXT test or a far end PSAFEXT test, local alien cross-talk test signal unit 361(L3) implements flowchart 160 to switch itself from the termination mode to the transmit mode and to direct remote alien cross-talk test signal unit 361(R3) to transition itself from the termination mode to the listen mode per flowchart 170 (FIG. 18). As a result, local alien cross-talk test signal unit 361(L3) controls a transmission of a RF test signal on disturber cable 31(3) at the step frequency $f_{ST}$ of $f_{in}$ in accordance with flowchart 200 (FIG. 21) for time period Δt during the $1^{st}$ step cycle, such as, for example, the RF test signal on disturber cable 31(3) at the step frequency $f_{ST}$ of $f_{in}$ for time period Δt during the $1^{st}$ step cycle as illustrated in FIG. 41.

For a far end PSANEXT test or a near end PSAFEXT test, local alien cross-talk test signal unit 361(L3) implements flowchart 180 to switch itself from the termination mode to the listen mode and to direct remote alien cross-talk test signal unit 361(R3) to transition itself from the termination mode to the transmit mode per flowchart 190 (FIG. 20). As a result, remote alien cross-talk test signal unit 361(R3) controls a transmission of a RF test signal on disturber cable 31(3) at the step frequency $f_{ST}$ of $f_{in}$ for time period Δt during the $1^{st}$ step cycle, such as, for example, the RF test signal on disturber cable 31(3) at the step frequency $f_{ST}$ of $f_{in}$ for time period Δt during the $1^{st}$ step cycle as illustrated in FIG. 41.

Interconnection base unit 371 again proceeds to stage S486 to wait trigger interval ΔT. Upon expiration of trigger interval ΔT, local alien cross-talk measurement unit 351(L) proceeds to stage S478 of flowchart 470 and interconnection base unit 371 returns to stage S482 of flowchart 480. Proceeding to stage S478 and returning to stage S482 represent a completion of the $1^{st}$ cycle of RF test signal transmission triggers on disturber cables 31, such as, for example, the $1^{st}$ cycle of RF test signal transmissions triggers on disturber cables 31 as shown in FIG. 41. Local alien cross-talk measurement unit 351(L) repeats stages S474–S478 and interconnection base unit 371 repeats stages S482–S488 to implement four (4) cycles of RF test signal transmissions triggers on disturber cables 31 in view of step frequency $f_{ST}$ being stepped up by frequency step size Δf for each cycle. For example, FIG. 41 further illustrates the execution of a $2^{nd}$ cycle through a $5^{th}$ cycle of RF test signal transmissions triggers on disturber cables 31 as commanded by local alien cross-talk measurement unit 351(L) whereby one of alien cross-talk measurement units 351 is concurrently executing flowchart 210 (FIG. 22) and flowchart 220 (FIG. 26) to determine the alien cross-talk on victim cable 30. The $5^{th}$ cycle is with the step frequency $f_{ST}$ equaling the maximum sweep frequency $f_{MAX}$ and therefore is the last cycle of this example.

Referring to FIGS. 8–41, those having ordinary skill in the art will appreciate how to apply the inventive principles of the present invention to an alien cross-talk environment of the present invention having less than or more than four (4) wire pairs per cable, and/or having less than or more than three (3) disturber cables.

Referring to FIGS. 1–41, those having ordinary skill in the art will appreciate the numerous advantages of the present invention including, but not limited to, a complete, convenient, cost effective and expedient measurement of alien cross-talk on a victim cable. In particular with connection to FIGS. 27–41, those having ordinary skill in the art will appreciate an alien cross-talk testing involving a non-simultaneous RF test signal transmissions at same frequency for difference disturber cables and a support for alien cross-talk mitigation.

Furthermore, an alien cross-talk measurement unit measuring the alien cross-talk on a victim cable will be able to ascertain which disturber cable is creating the alien cross-talk on the victim cable. For the example, from an execution of flowchart 470 (FIG. 39) and flowchart 480 (FIG. 40), the alien cross-talk measurement unit can acquire a pair-to-pair alien cross-talk signal PPAXT for each alien cross-talk test signal unit local-remote pairing whereby the alien cross-talk measurement unit can compute a cable-to-cable power sum alien cross-talk PSAXT for each alien cross-talk test signal unit local-remote pairing to thereby identify the one or more alien cross-talk test signal unit local-remote pairing having the mot significant influence on the victim cable. This facilitates an execution of an alien cross-talk mitigation process on the most influential alien cross-talk test signal unit local-remote pairing(s).

While the embodiments of the invention disclosed herein are presently considered to be preferred, various changes and modifications can be made without departing from the scope of the invention. The scope of the invention is indicated in the appended claims and all changes that come within the meaning and range of equivalents are intended to be embraced therein.

We claim:

1. An alien cross-talking testing system, comprising:
a plurality of alien cross-talk test signal units, each alien cross-talk test signal unit operable to be in electrical communication with a different disturber cable to participate in a transmission of a RF test signal thereon;
an alien cross-talk measurement unit operable to be in electrical communication with a victim cable to measure an alien cross-talk signal generated on the victim cable in response to any alien cross-talk coupling between the victim cable and at least one of the disturber cables; and
an interconnection base unit operable to be in electrical communication with the alien cross-talk measurement unit and the plurality of alien cross-talk test signals units to control non-simultaneous transmissions by the plurality of alien cross-talk test signal units of the RF test signals at a same frequency on the disturber cables as commanded by the alien cross-talk measurement unit.

2. The alien cross-talk testing system of claim 1,
wherein a first alien cross-talk test signal unit is operable to transmit a first RF test signal on a first disturber cable in response to a cable identification signal corresponding to the first disturber cable; and
wherein the interconnection base unit is operable to communicate the cable identification signal to the first alien cross-talk test signal unit as commanded by the alien cross-talk measurement unit.

3. The alien cross-talk testing system of claim 1,
wherein a first pair of alien cross-talk test signal units are connected to a first disturber cable;
wherein a second pair of alien cross-talk test signal units are connected to a second disturber cable; and
wherein, as commanded by the alien cross-talk measurement unit, the interconnection base unit is operable to trigger a transmission by the first pair of alien cross-talk test signal units of a first RF test signal on the first disturber cable and to trigger a transmission by the second pair of alien cross-talk test signal units of a second RF test signal on the second disturber cable based on a trigger interval for facilitating non-simultaneous transmissions of the first RF test signal on the first disturber cable and the second RF test signal on the second disturber cable at the same frequency.

4. The alien cross-talk testing system of claim 3,
wherein the first RF test signal and the second RF test signal both include an identical continuous pattern of RF frequency sweeps with each RF frequency sweep including a pre-determined number of frequency steps; and
wherein the trigger interval is a time differential between a beginning of the first RF frequency sweep of the first RF test signal and a beginning of the second RF frequency sweep of the second RF test signal.

5. The alien cross-talk testing system of claim 4,
wherein the alien cross-talk measurement unit is operable to execute a RF frequency measurement sweep on the victim cable; and
wherein a frequency step duration of the RF frequency measurement sweep is equal to a first frequency sweep duration of the first RF frequency sweep and a second frequency sweep duration of the second RF frequency sweep.

6. The alien cross-talk testing system of claim 5,
wherein the first RF test signal is a first RF frequency sweep test signal including a plurality of sine waves having a continuous stepped-up pattern over a first time period;
wherein the second RF test signal is a second RF frequency sweep test signal including the plurality of sine waves having the continuous stepped-up pattern over a second time period; and
wherein the trigger interval is a time differential between a beginning of the first time period and a beginning of the second time period.

7. The alien cross-talk testing system of claim 6,
wherein the alien cross-talk measurement unit is operable to execute a RF frequency measurement sweep on the victim cable; and
wherein a frequency step duration of the RF frequency measurement sweep is equal to a first frequency sweep duration of the RF frequency sweep and a second frequency sweep duration of the second RF frequency sweep.

8. The alien cross-talk testing system of claim 3,
wherein the first RF test signal and the second RF test signal both include an identical pulsed pattern of frequency sweeps with each frequency sweep including a pre-determined number of frequency steps; and
wherein the trigger interval is a time differential between a beginning of the first frequency sweep of the first RF test signal and a beginning of the second frequency sweep of the second RF test signal.

9. The alien cross-talk testing system of claim 8,
wherein the alien cross-talk measurement unit is operable to execute a RF frequency measurement sweep on the victim cable; and
wherein a frequency step duration of the RF frequency measurement sweep is greater than a summation of a first frequency step duration of the first RF test signal and a second frequency step duration of the second RF test signal.

10. The alien cross-talk testing system of claim 3,
wherein the first RF test signal is a first RF frequency sweep test signal including a plurality of sine waves having an pulsed stepped-up pattern over a first time period;
wherein the second RF test signal is a second RF frequency sweep test signal including the plurality of sine waves having the pulsed stepped-up pattern over a second time period; and
wherein the trigger interval is a time differential between a beginning of the first time period and a beginning of the second time period.

11. The alien cross-talk testing system of claim 10,
wherein the alien cross-talk measurement unit is operable to execute a RF frequency measurement sweep on the victim cable; and
wherein a frequency step duration of the RF frequency measurement sweep is greater than a summation of a first frequency step duration of the first RF test signal and a second frequency step duration of the second RF test signal.

12. An interconnection base unit, comprising:
an interconnection interface,
wherein the interconnection interface is operable to establish an electrical communication between the interconnection base unit and a plurality of alien cross-talk test signal units connected to a plurality of disturber cables to transmit RF test signals thereon, and wherein the interconnection interface is operable to establish an electrical communication between the interconnection base unit and an alien cross-talk measurement unit connected to a victim cable to measure an alien cross-talk signal generated on the victim cable in response to any alien cross-talk coupling between the victim cable and at least one of the disturber cables; and a control module operable to control non-simultaneous transmissions by the plurality of alien cross-talk test signal units of the RF test signals at a same frequency on the disturber cables as commanded by the alien cross-talk measurement unit.

13. The interconnection base unit of claim 12, wherein the control module is operable to communicate a cable identification signal to a first alien cross-talk test signal unit as commanded by the alien cross-talk measurement unit; and wherein the cable identification signal corresponds to a first disturber cable connected to the first alien crosstalking test signal unit.

14. The interconnection base unit of claim 12, wherein a first pair of alien cross-talk test signal units are connected to a first disturber cable;

wherein a second pair of alien cross-talk test signal units are connected to a second disturber cable; and wherein, as commanded by the alien cross-talk measurement unit, the interconnection base unit is operable to trigger a transmission by the first pair of alien cross-talk test signal units of a first RF test signal on the first disturber cable and to trigger a transmission by the second pair of alien cross-talk test signal units of a second RF test signal on the second disturber cable based on a trigger interval for facilitating non-simultaneous transmissions of the first RF test signal on the first disturber cable and the second RF test signal on the second disturber cable at the same frequency.

15. The interconnection base unit of claim 14, wherein the first RF test signal and the second RF test signal both include an identical continuous pattern of frequency sweeps with each frequency sweep including a pre-determined number of frequency steps; and wherein the trigger interval is a time differential between a beginning of the first frequency sweep of the first RF test signal and a beginning of the second frequency sweep of the second RF test signal.

16. The interconnection base unit of claim 14, wherein the first RF test signal and the second RF test signal both include an identical pulsed pattern of frequency sweeps with each frequency sweep including a pre-determined number of frequency steps; and wherein the trigger interval is a time differential between a beginning of the first frequency sweep of the first RF test signal and a beginning of the second frequency sweep of the second RF test signal.

17. The interconnection base unit of claim 14, wherein the first RF test signal is a first RF frequency sweep test signal including a plurality of sine waves having a continuous stepped-up pattern over a first time period;

wherein the second RF test signal is a second RF frequency sweep test signal including the plurality of sine waves having the continuous stepped-up pattern over a second time period; and wherein the trigger interval is a time differential between a beginning of the first time period and a beginning of the second time period.

18. The interconnection base unit of claim 14, wherein the first RF test signal is a first RF frequency sweep test signal including a plurality of sine waves having an pulsed stepped-up pattern over a first time period;

wherein the second RF test signal is a second RF frequency sweep test signal including the plurality of sine waves having the pulsed stepped-up pattern over a second time period; and wherein the trigger interval is a time differential between a beginning of the first time period and a beginning of the second time period.

19. The interconnection base unit of claim 12, further comprising:

a power module operable to supply power to the alien cross-talk test signal units.

20. A method of operating an interconnection base unit, the method comprising:

establishing an electrical communication between the interconnection base unit and a plurality of alien crosstalk test signal units connected to a plurality of disturber cables to transmit RF test signals thereon;

establishing an electrical communication between the interconnection base unit and an alien cross-talk measurement unit connected to a victim cable to measure an alien cross-talk signal generated on the victim cable in response to any alien cross-talk coupling between the victim cable and the disturber cables; and controlling non-simultaneous transmissions by the plurality of alien cross-talk test signal units of the RF test signals at a same frequency on the disturber cables as commanded by the alien cross-talk measurement unit.

\* \* \* \* \*